US011603898B2

(12) United States Patent
Schneider

(10) Patent No.: US 11,603,898 B2
(45) Date of Patent: Mar. 14, 2023

(54) SHOCK ISOLATORS UTILIZING MULTIPLE DISC SPRINGS

(71) Applicant: Composite Technology Concepts, LLC, Tacoma, WA (US)

(72) Inventor: Terrence Lee Schneider, Puyallup, WA (US)

(73) Assignee: Composite Technology Concepts, LLC, Tacoma, WA (US)

( * ) Notice: Subject to any disclaimer, the term of this patent is extended or adjusted under 35 U.S.C. 154(b) by 221 days.

(21) Appl. No.: 16/900,167

(22) Filed: Jun. 12, 2020

(65) Prior Publication Data

US 2020/0393013 A1    Dec. 17, 2020

Related U.S. Application Data

(60) Provisional application No. 62/861,296, filed on Jun. 13, 2019.

(51) Int. Cl.
*F16F 3/02* (2006.01)
*F16F 15/06* (2006.01)

(52) U.S. Cl.
CPC ............... *F16F 3/02* (2013.01); *F16F 15/06* (2013.01); *F16F 2234/04* (2013.01); *F16F 2236/04* (2013.01)

(58) Field of Classification Search
CPC .......... F16F 3/02; F16F 15/06; F16F 2234/04; F16F 2236/04; F16F 1/32
See application file for complete search history.

(56) References Cited

U.S. PATENT DOCUMENTS

| 3,127,157 A | 3/1964 | Webb |
| 5,655,632 A | 8/1997 | Valembois |

(Continued)

FOREIGN PATENT DOCUMENTS

| DE | 2822595 A | * 11/1979 | ................ F16F 1/32 |
| DE | 4325990 A1 | * 2/1994 | ................ F16F 1/32 |

(Continued)

OTHER PUBLICATIONS

PCT International Search Report and PCT Written Opinion of the International Searching Authority; Application No. PCT/US2020/037469; dated Sep. 14, 2020; 15 pages.

(Continued)

*Primary Examiner* — Xuan Lan Nguyen
(74) *Attorney, Agent, or Firm* — Conley Rose, P.C.; Brooks W Taylor

(57) ABSTRACT

A first shock isolator is provided that includes an axial compression element, a first disc spring, a disc spring system, and an annular stand-off. The first disc spring has a non-linear load-deflection response. The disc spring system is configured to be deflected by the first disc spring and has a linear load-deflection response. A second shock isolator is provided that includes an axial compression element, first and second disc springs and corresponding first and second annular stand-offs. The first and second disc springs have non-linear load-deflection responses. The first and second annular stand-offs hold the first disc and second disc springs in a spaced apart parallel configuration. The second disc spring is configured to be deflected by the first disc spring. The first and second shock isolators exhibit first and second combined load-deflection curves that include a constant load region.

10 Claims, 15 Drawing Sheets

(56) References Cited

U.S. PATENT DOCUMENTS

| | | | |
|---|---|---|---|
| 6,705,813 B2 | 3/2004 | Schwab | |
| 8,500,108 B2 * | 8/2013 | Rode | F16F 1/32 267/260 |
| 9,447,839 B2 | 9/2016 | Dunning | |
| 10,677,310 B2 * | 6/2020 | Gandhi | F16F 15/06 |
| 11,137,045 B2 * | 10/2021 | Gandhi | F16F 1/32 |
| 2008/0116623 A1 * | 5/2008 | Crocker | F16F 1/32 267/169 |
| 2011/0049777 A1 * | 3/2011 | Evans | F16F 1/32 267/162 |

FOREIGN PATENT DOCUMENTS

| | | | | |
|---|---|---|---|---|
| FR | 2388170 A | * | 12/1978 | F16B 43/00 |
| GB | 1064334 A | | 4/1967 | |
| IT | 20100918 A | | 11/2011 | |
| JP | 62028524 A | | 2/1987 | |
| JP | 09060674 A | * | 3/1997 | |
| SU | 1174629 A | * | 8/1985 | F16F 1/32 |

OTHER PUBLICATIONS

Clurman, S. P.; "The Design of Nonlinear Leaf Springs"; Transactions of the American Society of Mechanical Engineers; vol. 73, No. 2; Feb. 1, 1951; 7 pages.

Almen, J. O., et al.; "The Uniform-Section Disk Spring"; Transactions of the American Society of Mechanical Engineers; vol. 58; 1936; 10 pages.

Karakaya, Sukru; "Investigation of Hybrid and Different Cross-Section Composite Disc Springs Using Finite Element Method"; Transactions of the Canadian Society for Mechanical Engineering; vol. 36, No. 4; 2012; 14 pages.

Meng, Lingshuai, et al.; "Theoretical Design and Characteristics Analysis of a Quasi-Zero Stiffness Isolator Using a Disk Spring as Negative Stiffness Element"; Hindawi Publishing Corporation; Shock and Vibration; 2015; 20 pages.

* cited by examiner

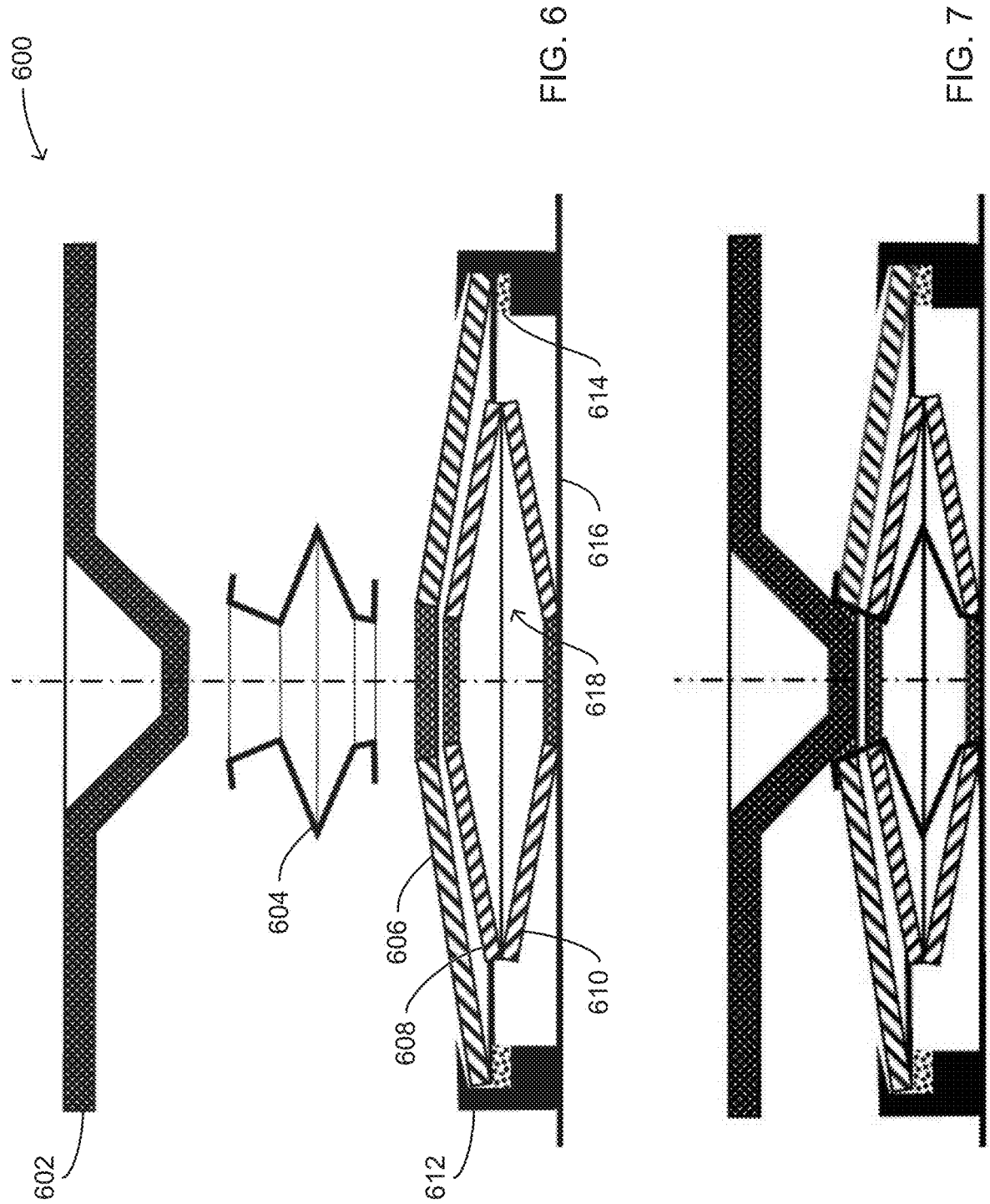

SHOCK ISOLATORS UTILIZING MULTIPLE DISC SPRINGS

CROSS-REFERENCE TO RELATED APPLICATIONS

This application claims priority to U.S. Provisional Application No. 62/861,296 filed on Jun. 13, 2019 by Terrence Lee Schneider, entitled "Shock Isolation Device Utilizing Multiple Disc Springs", which is incorporated herein by reference as if reproduced in its entirety.

TECHNICAL FIELD OF THE DISCLOSURE

The present disclosure relates to shock isolation devices, more specifically to shock isolators comprising a plurality of disc springs.

BACKGROUND

Shock may be defined as a transient condition where a single impulse of energy produced by a force is transferred to a system in a short period of time and with large acceleration.

The reduction of shock may be achieved by the use of isolators which results in the storage of the transient shock energy within the isolator and the subsequent release of the energy over a longer period of time by physical deflection of the isolator. Therefore, an effective shock isolation system receives and releases shock energy over a period of time greater than what would have been observed had a resilient isolator not been applied.

High levels of acceleration are typically a detriment to the performance of a system for a variety of reasons. Moreover, humans and equipment can be harmed if various thresholds of acceleration are exceeded. Thus, improvements in mechanical isolation systems to mitigate shock transmitted to humans and equipment is of interest.

The design of an ideal shock isolator would be one that imparts no more than a desired threshold level of acceleration to a structure or mass, while keeping the deflection to do so to a minimum. Designing such an optimal shock isolator entails two conflicting goals: low acceleration transmission and low isolator deflection. Low transmission of acceleration to a mass or body typically requires significant deflection. But this can pose a problem in many practical applications since geometric limitations usually require minimizing deflection in the isolating device. For example, the use of a stiff spring may keep the deflection of an isolator low, but will result in a high amount of acceleration transmitted from the base to the mass.

FIG. 1 presents a load-deflection graph 100 of an ideal shock isolator. Axis 102 represents deflection and axis 104 represents load (or force). The load-deflection graph 100 is considered to be ideal because a maximum deflection 106 experienced by the isolator represents the minimum deflection required to isolate a mass from given shock force while transmitting to the isolated structure no more than a threshold acceleration of a maximum load 108 divided by a mass m of the isolated structure.

Such an ideal shock isolator is infinitely stiff for zero relative deflection but provides isolation at a constant load for higher deflections. When a structure isolated by an ideal shock isolator experiences a shock force to the ideal shock isolator, a response such as the load-deflection graph 100 prevents the structure from experiencing more than the threshold level of acceleration while minimizing the relative deflection required to do so.

SUMMARY

In a first embodiment, a shock isolator includes an axial compression element (ACE), a first disc spring, a disc spring system, and an annular stand-off. The first disc spring is mechanically coupled to the ACE, is coaxial with the ACE, and is configured to be deflected by the ACE. The first disc spring has a non-linear load-deflection response. The disc spring system is coaxial with the first disc spring and has a first side facing the first disc spring and a second side mechanically coupled to a mass to be isolated from a shock load. The disc spring system is configured to be deflected by the first disc spring and has a linear load-deflection response. The annular stand-off is mechanically coupled to the mass and to an outer edge of the first disc spring. The annular stand-off is coaxial with the first disc spring.

In a second embodiment, a shock isolator includes an ACE, a first disc spring, a first annular stand-off, a second disc spring, and a second annular stand-off. The first disc spring is mechanically coupled to the ACE, is coaxial with the ACE, and is configured to be deflected by the ACE. The first disc spring has a first non-linear load-deflection response. The first annular stand-off is mechanically coupled to an outer edge of the first disc spring and is coaxial with the first disc spring. The second disc spring is coaxial with the first disc spring, is configured to be deflected by the first disc spring, and has a second non-linear load-deflection response. The second annular stand-off is mechanically coupled to an outer edge of the second disc spring, to the first annular stand-off, and to a mass to be isolated from a shock load. The first annular stand-off and the second annular stand-off are configured to hold the first disc spring and the second disc spring in a spaced apart parallel configuration. The second annular stand-off is coaxial with the second disc spring.

BRIEF DESCRIPTION OF THE DRAWINGS

For a more complete understanding of this disclosure, reference is now made to the following brief description, taken in conjunction with the accompanying drawings in which like reference numerals indicate like features.

FIG. 6 presents an exploded cross-section view of a shock isolator of the first type according to the disclosure.

FIG. 7 presents an assembled cross-section view of the shock isolator of FIG. 6.

DETAILED DESCRIPTION

A novel shock isolator is described which can approach this ideal behavior by providing isolation at a constant load over a chosen range of deflection. In some embodiments, the device consists of two different geometries of disc springs, each of which as individual springs, exhibit significantly different load-deflection behavior: a first disc spring exhibits non-linear load-deflection behavior (having a meta-stable region which enables "snap-through" of the disc) and a disc spring system comprising one or more disc springs exhibits linear load-deflection. When combined in series as a shock isolation system, the sum of their properties approach ideal shock isolation by exhibiting a constant load over a specific range of deflection, key to efficient shock isolation.

The meaning of "linear" and "non-linear" disc springs is a technical definition known in the industry. It is based on a disc's load-deflection profile. This profile is a function of a disc's free height-to-thickness ratio (h/t) (free height meaning the distance the disc can compress before it is in a flat configuration). A disc described as having linear load-deflection behavior (or linear "force-deflection" or "load-displacement" behavior), may have a range of height/thickness ratios in which the disc's load-deflection behavior is not exactly linear but is considered substantially linear. For purposes of this disclosure, discs with an h/t ratio greater than zero but less than the square root of 2 (i.e. $0 > h/t < \sqrt{2}$) are considered linear, and discs with an h/t ratio greater than or equal to the square root of 2 are considered non-linear.

Figure 1:
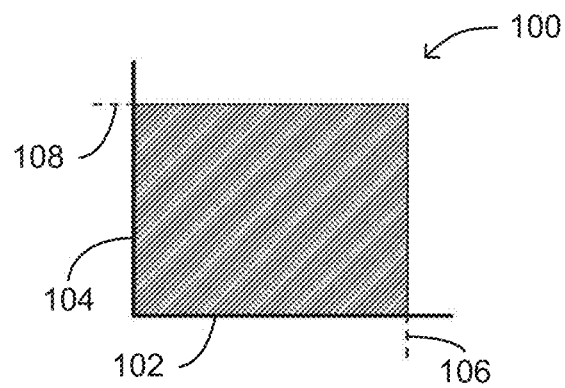
FIG. 1 presents a load-deflection graph of an ideal shock isolator.
Figure 2:
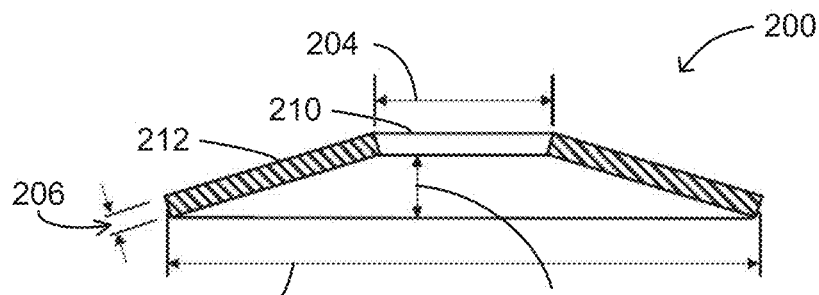
FIG. 2 presents a cross-section view of a disc spring.

FIG. 2 presents a cross-section view of a disc spring 200 that may be used in shock isolators according to the disclosure. The disc spring 200 has a frusto-conical shape that includes a top 210 and a skirt 212. Dimension 202 is $D_e$, an external diameter of the disk. Dimension 204 is $D_i$, an inner diameter of the disk. Dimension 206 is t, a material thickness of the disk. Dimension 208 is h, a free height of the disk (which may alternatively be referred to as $h_0$). The dimensions of the disc spring 200 may be referred to as a geometry of the disc spring 200.

In some embodiments of shock isolators according to the disclosure, the top 210 includes an aperture having a diameter equal to $D_i$, as shown in FIG. 2. In other embodiments, the top 210 comprises a solid planar surface having a diameter equal to $D_i$. In some such embodiments, the solid planar top surface includes an aperture having a diameter less than $D_i$. In still other embodiments of shock isolators according to the disclosure, disc springs may include slots or notches extending from an aperture in the top 210 radially toward the outer edge of the disc spring 200 (which may be referred to as diaphragm disc springs).

In yet other embodiments of shock isolators according to the disclosure, the skirt 212 of the disc spring 200 may have a trapezoidal cross-section or a curved cross-section. In still other embodiments of shock isolators according to the disclosure, rather than having a frusto-conical shape, the disc spring 200 may have a curved cross-section across its width. Such curved springs may include central apertures, which may include slots or notches as described above.

In general, the load-deflection performance of disc springs can be tailored to particular applications by controlling the disc springs' value of h/t. As described above, a spring with $h/t \geq \sqrt{2}$ exhibits non-linear load-deflection behavior, and a spring with $h/t < \sqrt{2}$ exhibits linear load-deflection behavior.

Figure 3:
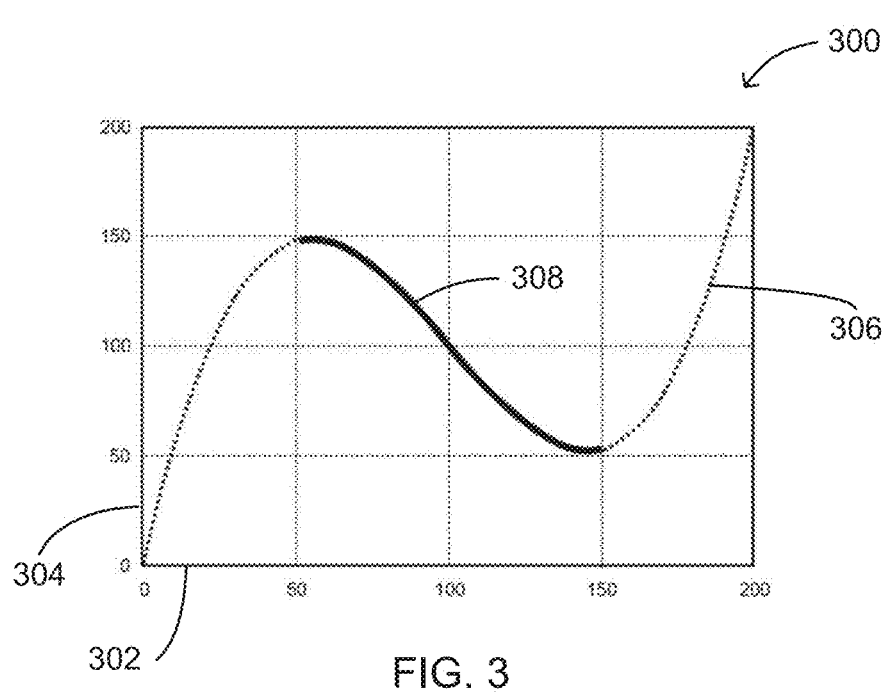
FIG. 3 presents a load-deflection graph of a non-linear disc spring.

FIG. 3 presents a load-deflection graph 300 of a non-linear disc spring that may be used in shock isolators according to the disclosure. Axis 302 represents deflection and axis 304 represents load. This convention of the horizontal axis representing deflection and the vertical axis representing load will be used throughout this disclosure. The dotted line 306 indicates a load-deflection curve of the non-linear disc spring, showing a percent (%) of load to flat (from 0 to 200%) absorbed by the disc spring as it is deflected from 0 to 200% of flat. The disc spring begins as concave in a first direction at 0% deflection; at 100% deflection, the disc spring is flat; and at 200% deflection, the disc spring is concave in a second direction, opposite to the first direction.

The non-linear disc spring exhibits "snap-through" or inversion during axial compression as it deflects through its flat, bi-stable instability region. A solid line indicates the instability region 308 of the load-deflection curve, where the disc spring is reversing from concave in the first direction to concave in the second direction. The non-linear disc spring is characterized as "bi-stable", because its load response to increasing deflection increases in a stable manner prior to and after the snap-through instability zone, but decreases in the instability region 308.

The geometry of the non-linear disc spring determines a deflection range of the snap-through instability zone—i.e., the amount of deflection at which the instability zone begins and the amount of deflection at which the instability zone ends. The deflection range may be controlled by selecting desired values for one or both of the free height and/or a ratio of the outer diameter to inner diameter of the non-linear disc spring. Additionally, the geometry of the non-linear disc spring determines a load range of the instability zone—i.e., an amount of load at which the instability zone begins and an amount of deflection at which the instability zone ends. The load range may be controlled by selecting desired value(s) for any or all of the thickness, the inner diameter, and/or the outer diameter of the non-linear disc spring.

Figure 4:
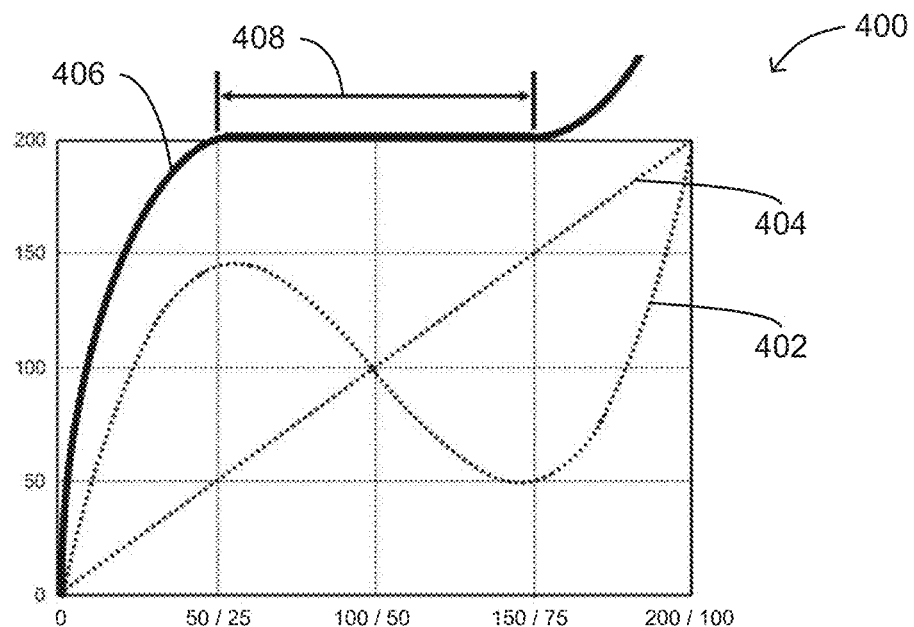
FIG. 4 presents a load-deflection graph of a shock isolator of a first type according to the disclosure.

FIG. 4 presents a load-deflection graph 400 of a shock isolator of a first type according to the disclosure. The shock isolator of the first type is described in more detail below with reference to FIGS. 6-16B. The shock isolator of the first type includes two different geometries of disc springs, each geometry exhibiting significantly different load-deflection behavior. A disc spring of a first geometry exhibits non-linear behavior having a bi-stable region in which snap-through occurs during axial compression of the spring, as shown by a load-deflection curve 402. A disc spring system comprising one or more disc springs of a second geometry exhibits linear load-deflection behavior, as shown by a load-deflection curve 404. The combined geometries of the disc springs of a disc spring system comprising two or more disc springs may be referred to as a geometry of the disc spring system. In some embodiments, two disc springs are placed in series (i.e., "back-to-back" or having concave sides facing toward each other) to yield a linear load-deflection behavior upon axial compression when contacted by the first disc spring from above. Combined in series as a shock isolation system, the sum of the properties of all disc springs causes the shock isolator of the first type to produce a combined load-deflection curve 406, which includes a constant load region 408 of deflection providing a constant load, resulting in more efficient shock isolation.

The constant load region 408 is characterized by a deflection range over which the shock isolator absorbs the constant load. The deflection range extends from the minimum deflection to the maximum deflection at which the shock isolator absorbs the constant load. The deflection range of the constant load region 408 corresponds to the instability region of the non-linear disc spring. The constant load region 408 is also characterized by a load value, or a value of load that the shock isolator absorbs in the constant load region 408.

For a particular application, a desired load value and a desired deflection range of the constant load region 408 (also referred to as the "plateau load" region) can be obtained by selecting a number and combination of discs, disc materials, and disc geometries used in the shock isolator of the first type—predominantly, but not solely, by controlling the non-linear disc load-deflection curve 402. An area under the combined load-deflection curve 406 is equivalent to a total energy absorbed by the shock isolator of the first type.

Because the first type of shock isolator includes both a non-linear disc spring (which experiences 200% deflection) and a set of linear disc springs (which experience 100% deflection), the scale of the horizontal deflection axis has been relabeled in FIGS. 4 and 12B-16B. The scale for the non-linear load-deflection curve 402 is 0, 50, 100, 150, and 200. The scale for the linear load-deflection curve 404 is 0, 25, 50, 75, and 100.

Figure 5:
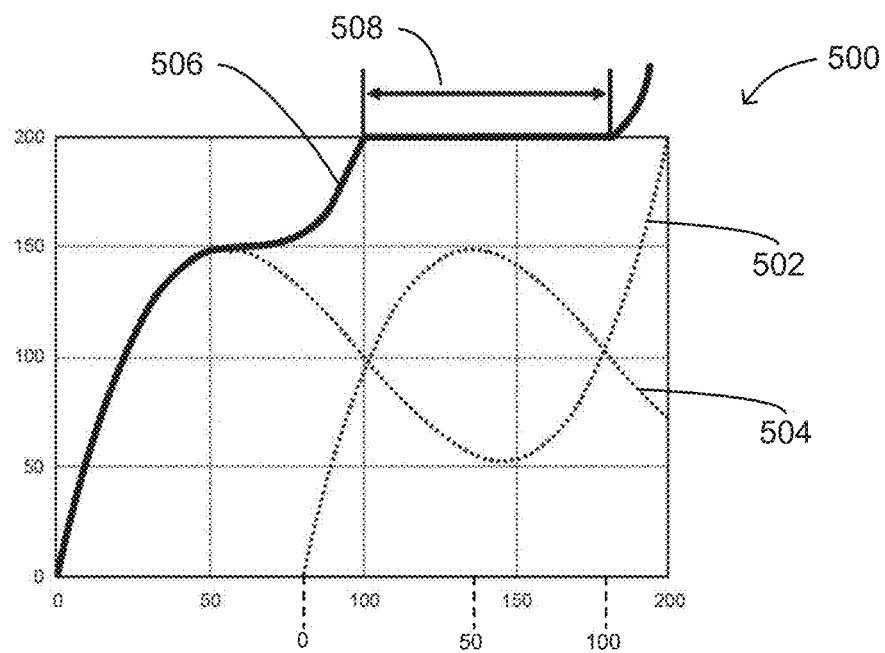
FIG. 5 presents a load-deflection graph of a shock isolator of a second type according to the disclosure.

FIG. 5 presents a load-deflection graph 500 of a shock isolator of a second type according to the disclosure. The shock isolator of the second type is described in more detail below with reference to FIGS. 17-23B. The shock isolator of the second type includes two non-linear disc springs in a spaced-apart parallel configuration. A first of the two disc springs is deflected by an applied load into its snap-through region, at which point it makes contact with a second of the two disc springs. As more load is applied, both disc springs absorb the applied load, until the first disc spring is fully deflected, at which point the second disc spring is partially through its snap-through region. The non-linear behavior of the first disc spring is shown by dotted line 502, and the non-linear behavior of the second disc spring is shown by dotted line 504. The combination of disc springs in the shock isolator of the second type produces a combined load-deflection curve 506, which includes a region 508 of deflection providing a constant load, resulting in more efficient shock isolation.

For a particular application, a desired load value and a desired deflection range (as defined with reference to the constant load region 408), of the constant load region 508 can be obtained by selecting the number and combination of discs, disc materials, disc geometries, and vertical spacing of the discs (to control at what point the second disc spring begins deflecting) used in the shock isolator of the second type. As described for the combined load-deflection curve 406, the area under the combined load-deflection curve 506 is equivalent to a total energy absorbed by the shock isolator of the second type.

Because the shock isolator of the second type includes two non-linear disc springs, two scales appear on the horizontal deflection axis in FIGS. 5 and 20B-23B. The first non-linear disc spring experiences 200% deflection, which is represented in a first scale of the axis. The second non-linear disc spring experiences less than 200% deflection and its percentage of deflection is represented in a second scale of the axis.

One benefit of shock isolators of both the first and second types according to the disclosure is that they provide greater area under the shock isolator load-deflection curve as compared to either a linear or non-linear disc spring. The area under the load-deflection curve represents work energy absorbed by the shock isolator. A shock isolator according to the disclosure has a plateau region and is more effective regarding total absorbed energy. The plateau region also represents storage of the transient shock energy within the isolator, allowing the subsequent release of the energy over a longer period of time by physical deflection of the isolator. Shock loads above the load plateau are also mitigated within the deflection range of the plateau, which improves the isolation of structures from detrimental shock impulses.

FIG. 6 presents an exploded cross-section view of a shock isolator 600 of the first type according to the disclosure. The shock isolator 600 comprises an axial compression element (ACE) 602, an alignment collar 604, a first disc spring 606, a disc spring system 618 comprising a second disc spring 608 and a third disc spring 610, an annular stand-off 612, and an elastomer gasket 614. The shock isolator 600 is mechanically coupled by the annular stand-off 612 to a mass 616 to be isolated from a shock load. The mass 616 is not an element of the shock isolator 600.

The ACE 602 is a rigid component configured to receive the shock load and transfer the shock load to the first disc spring 606 via the alignment collar 604. The first disc spring 606 is a disc spring having a non-linear load-deflection response and is mechanically coupled by an outer edge to the annular stand-off 612. The outer edge of the first disc spring 606 rests on the elastomer gasket 614. In an unloaded configuration of the shock isolator 600, a convex side of the first disc spring 606 faces the second disc spring 608.

The second and third disc springs 608 and 610 are a pair of series-mounted disc springs that comprise a disc spring system 618, mounted with their concave sides facing toward each other and with their outer rims in contact with each other. Each of the second and third disc springs 608 and 610 have a linear load-deflection response, as does the disc spring system 618. The second disc spring 608 forms a first side of the disc spring system 618. The third disc spring 610 forms a second side of the disc spring system 618. In the unloaded configuration of shock isolator 600, the first side of the disc spring system 618 faces and is spaced apart from the first disc spring 606. The second side of the disc spring system 618 is mechanically coupled, via the alignment collar 604, to the mass 616.

As described above, in other embodiments the disc spring system 618 may comprise a single disc spring or more than two disc springs. In such embodiments having a single disc spring, the disc spring may be oriented with either its concave or its convex face toward the first disc spring 606. In such embodiments having three or more disc springs, the disc springs are coupled in series and the topmost disc spring may have either its concave or its convex face toward the first disc spring 606.

FIG. 7 presents an assembled cross-section view of the shock isolator 600 of FIG. 6. The alignment collar 604 is inserted into central apertures of the first disc spring 606, the second disc spring 608, and the third disc spring 610 and holds those elements in a coaxial alignment. The outer edge of the first disc spring 606 is received in a recess in an inner side of the annular stand-off 612 and holds the annular stand-off 612 and the elastomer gasket 614 in a coaxial alignment with the other elements of the shock isolator 600. As the shock isolator 600 is placed under an increasing axial load, the alignment collar 604 compresses while maintaining coaxial alignment of the other elements of the shock isolator 600.

In some embodiments, the top of the first disc spring 606 (as oriented in FIG. 7) has a $D_i$ and an aperture larger than the $D_i$ of the second disc spring 608. In such an embodiment, the first disc spring 606 may not sufficiently depress the second and third disc springs 608 and 610 to produce the constant load region 408 described with reference to FIG. 4. In such embodiments, a flat, rigid circular plate with an aperture (similar to a washer) may be positioned horizontally between the first disc spring 606 and the second disc spring 608. The circular plate has an outer diameter greater than the $D_i$ of the first disc spring 606 and an aperture with a diameter configured to accept the alignment collar 604 and be held in coaxial alignment of the other elements of the shock isolator 600. The dimensions of the circular plate are selected to produce a shock isolator having a constant load region such as the constant load region 408.

A frustopyramidal central portion of the ACE 602 has a defined angle and height that are chosen to prevent the central portion protruding beyond the thickness of the first disc spring 606 and making contact with the second disc spring 608. The defined angle may be chosen based upon a thickness of the first disc spring 606 and/or a diameter of a central aperture of the first disc spring 606—which can vary depending on the application. The defined angle may fall into a range of angles between a maximum value and a minimum value. The ACE 602 is seated into the aperture of the first disc spring 606 (via the alignment collar 604) and stays positioned there during compression of the discs in the shock isolator 600. In some embodiments of the shock isolator 600, the flat apex of the frustopyramidal central portion of the ACE 602 is wide enough to mechanically couple with a portion of the top surface of the first disc spring 606 surrounding its central aperture, rather than being seated into the aperture of the first disc spring 606.

In various embodiments, the ACE 602 is rigid and configured to be rigid and transfer shock loads to the other elements of the shock isolator 600. The ACE 602 is further configured to transfer shock loads without experiencing permanent deformation upon removal of the shock loads. In some embodiments, the ACE 602 comprises organic polymer plastic, which may be thermoplastic or thermosetting. In some such embodiments, the ACE 602 is molded into shape while soft and then set into a final rigid form. In some such embodiments, the ACE 602 comprises unreinforced organic polymer plastic. In other such embodiments, the ACE 602 comprises a composite organic polymer plastic material, reinforced with particles (metallic or non-metallic), discontinuous fibers, or continuous fibers. Suitable reinforcement fiber types include metal, carbon, glass. Other reinforcement fiber types include Kevlar, nylon, polyethylene, and other suitable polymers.

In some embodiments, the ACE 602 comprises a metal having isotropic properties (i.e., mechanical, thermal or physical properties equivalent in all directions). In other embodiments, the ACE 602 comprises a hybrid composite material that includes layers (or discrete plies) of different materials such as various combinations of metallic layers and composite layers. Such hybrid composite materials may be referred to as FMLs (Fiber Metal Laminates). Such laminates include discrete layers in various combinations including metallic layers intermixed with layers of composite plies that may be carbon, glass, or polymer fiber-reinforced composite materials.

The alignment collar 604 is configured with a degree of rigidity and thickness to maintain coaxial alignment of the disc springs 606, 608, and 610 while also being configured to contract to a shorter length during compression of the disc springs from applied shock loads. Suitable materials for fabrication of this component would include plastic made from a wide range of organic polymers, either thermoplastic or thermosetting, that can be molded into shape while soft and then set into a final semi-rigid form. Such plastics may be unreinforced or increased in rigidity with reinforcement additives. Reinforcement examples may include particles (metallic or non-metallic) or discontinuous fibers.

In some embodiments, the alignment collar 604 comprises organic polymer plastic, which may be thermoplastic or thermosetting. In some such embodiments, the alignment collar 604 is molded into shape while soft and then set into a final semi-rigid form. In some such embodiments, the alignment collar 604 comprises unreinforced organic polymer plastic. In other such embodiments, the alignment collar 604 comprises a composite organic polymer plastic material, reinforced with particles (metallic or non-metallic) or discontinuous fibers. Suitable reinforcement fiber types include metal, carbon, and glass. Other reinforcement fiber types include Kevlar, nylon, polyethylene, and other suitable polymers.

The annular stand-off 612 is configured with a degree of rigidity sufficient to contain and support the first disc spring 606 at its base but also having a degree of flexibility to allow for insertion of the first disc spring 606 into the annular stand-off 612 (as described with reference to FIG. 9). In some embodiments, the annular stand-off 612 comprises organic polymer plastic, which may be thermoplastic or thermosetting. In some such embodiments, the annular stand-off 612 is molded into shape while soft and then set into a final semi-rigid form. In some such embodiments, the annular stand-off 612 comprises unreinforced organic polymer plastic. In other such embodiments, the annular stand-off 612 comprises a composite organic polymer plastic material, reinforced with particles (metallic or non-metallic) or discontinuous fibers. Suitable reinforcement fiber types include metal, carbon, and glass. Other reinforcement fiber types include Kevlar, nylon, polyethylene, and other suitable polymers.

In some embodiments, the annular stand-off 612 comprises a metal having isotropic properties (i.e., mechanical, thermal or physical properties equivalent in all directions). In such embodiments, the annular stand-off 612 may be fabricated in two parts to allow the annular stand-off 612 to be assembled around the first disc spring 606, rather than the first disc spring 606 being inserted into the annular stand-off 612.

Figure 8:
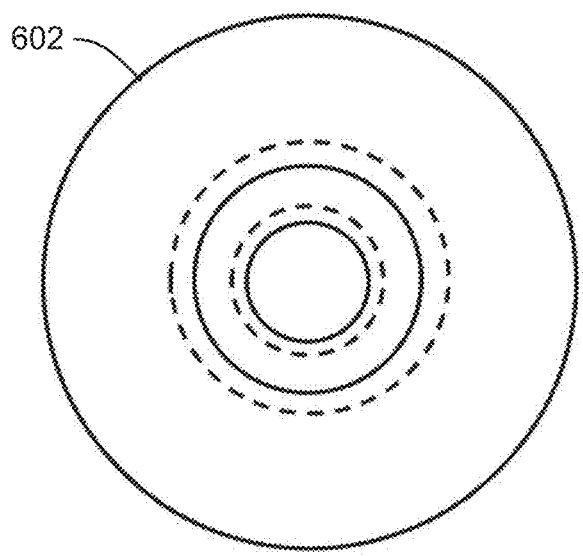
FIGS. 8-11 present detail views of elements of the shock isolator of FIG. 6.

FIGS. 8-11 present detail views of elements of the shock isolator 600 of FIG. 6. FIG. 8 presents a hidden line plan view of the ACE 602.

Figure 9:
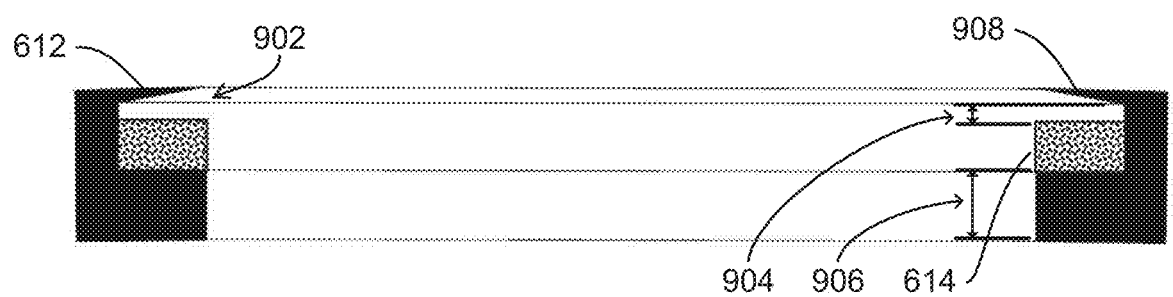
Figure 16A:
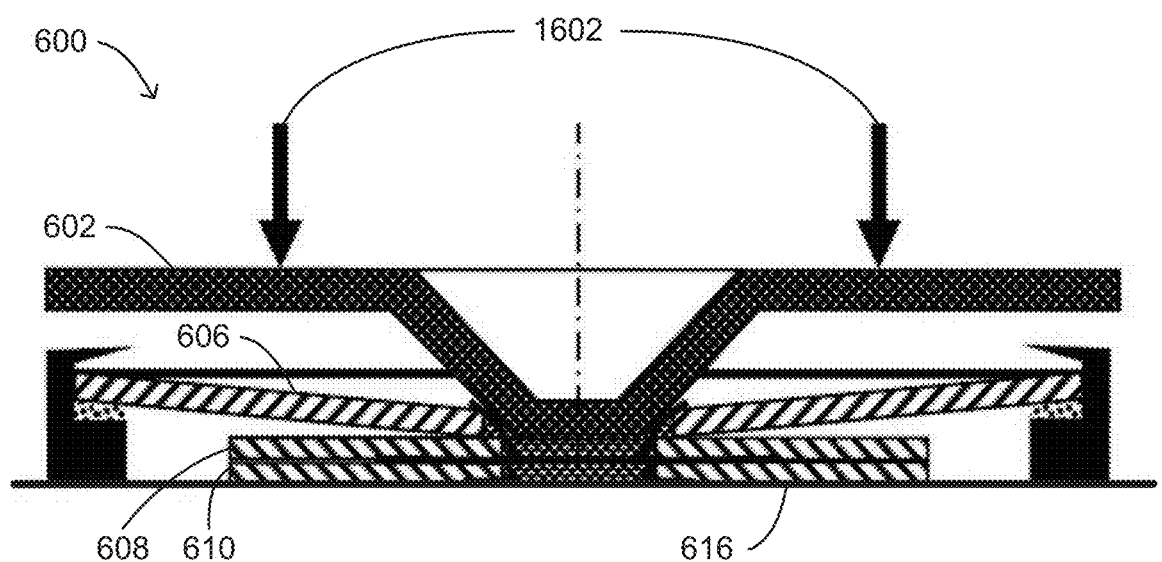

FIG. 9 presents a cross-section view of the annular stand-off 612 and the elastomer gasket 614. A recess 902 in an inner side of the annular stand-off 612 is configured to receive an outer edge of first disc spring 606. The recess 902 is configured with a height that exceeds a height of the elastomer gasket 614 by an amount 904. The amount 904 is selected to be slightly less than a material thickness t of the first disc spring 606. Once the first disc spring 606 is inserted into the recess 902, the elastomer gasket 614 is in in compression and operates to retain the first disc spring 606 in the recess 902. In some embodiments, an upper edge 908 of the annular stand-off 612 is flexible and configured to allow insertion of the first disc spring 606 into the recess 902. In other embodiments, the annular stand-off 612 is fabricated in two parts and assembled around the first disc spring 606. The annular stand-off 612 has a base height 906 that is selected to be high enough to allow full snap-through deflection of the first disc spring 606 (as shown in FIG. 16A). The base height 906 is also selected (in conjunction with the material and thickness of the elastomer gasket 614) to cause the first disc spring 606 to contact the second disc spring 608 at full compression of the elastomer gasket 614.

Figure 10:
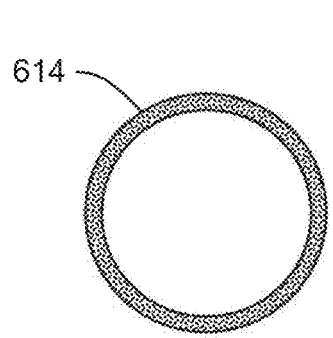
Figure 11:
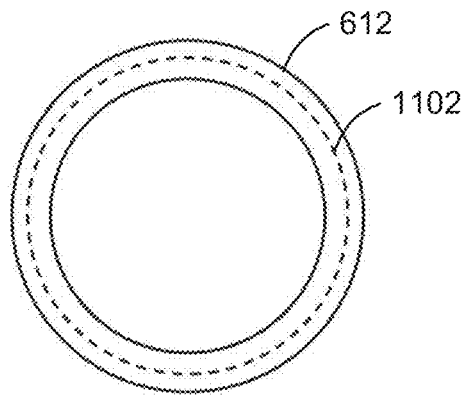

FIG. 10 presents a plan view of the elastomer gasket 614. FIG. 11 presents a hidden line plan view of annular stand-off 612. A dotted line 1102 indicates an inner wall of the recess 902.

Figure 12A:
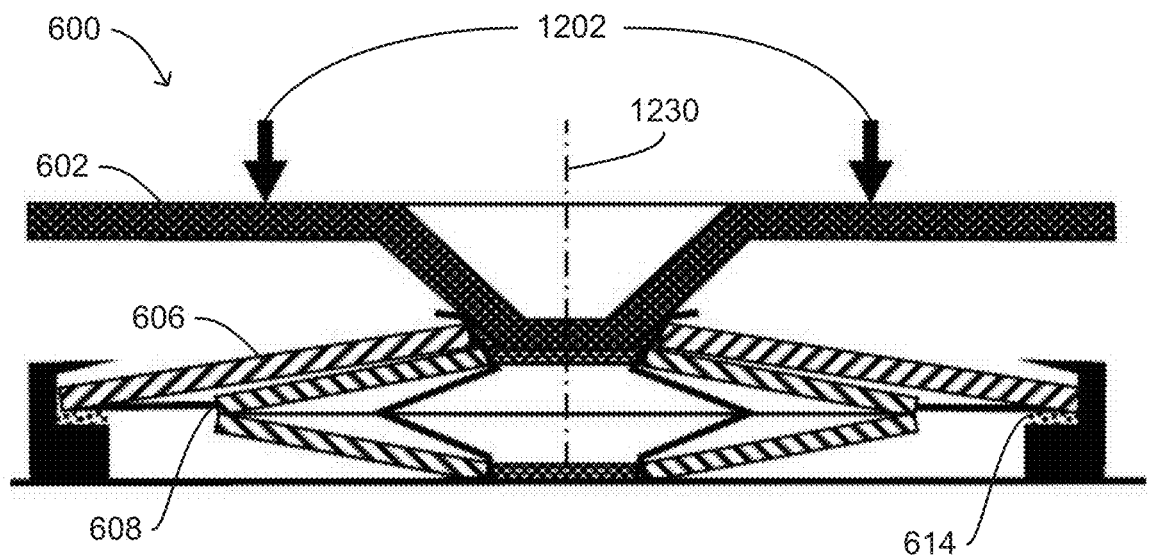
FIGS. 12A-B through 16A-B present configurations and load-deflection graphs of the shock isolator of FIG. 6 under increasing amounts of deflection.

FIGS. 12A-B through 16A-B present configurations and load-deflection graphs of the shock isolator 600 of FIG. 6 under increasing amounts of deflection. FIG. 12A shows a first loaded configuration of the shock isolator 600. An axial shock load 1202 has been applied to the ACE 602 along an axis of deflection 1230, causing the first disc spring 606 to compress the elastomer gasket 614. The first disc spring 606 has not begun deflecting but, due to the compression of the elastomer gasket 614, an inner portion of the concave side of the first disc spring 606 has come into contact with an inner portion of the convex side of the second disc spring 608.

As described above, in some embodiments no elastomer gasket 614 is included in the shock isolator 600 and the base height 906 of the annular stand-off 612 is selected to cause the first disc spring 606 to contact the second disc spring 608 in an unloaded configuration. FIG. 12A presents an unloaded configuration of such an embodiment.

Figure 12B:
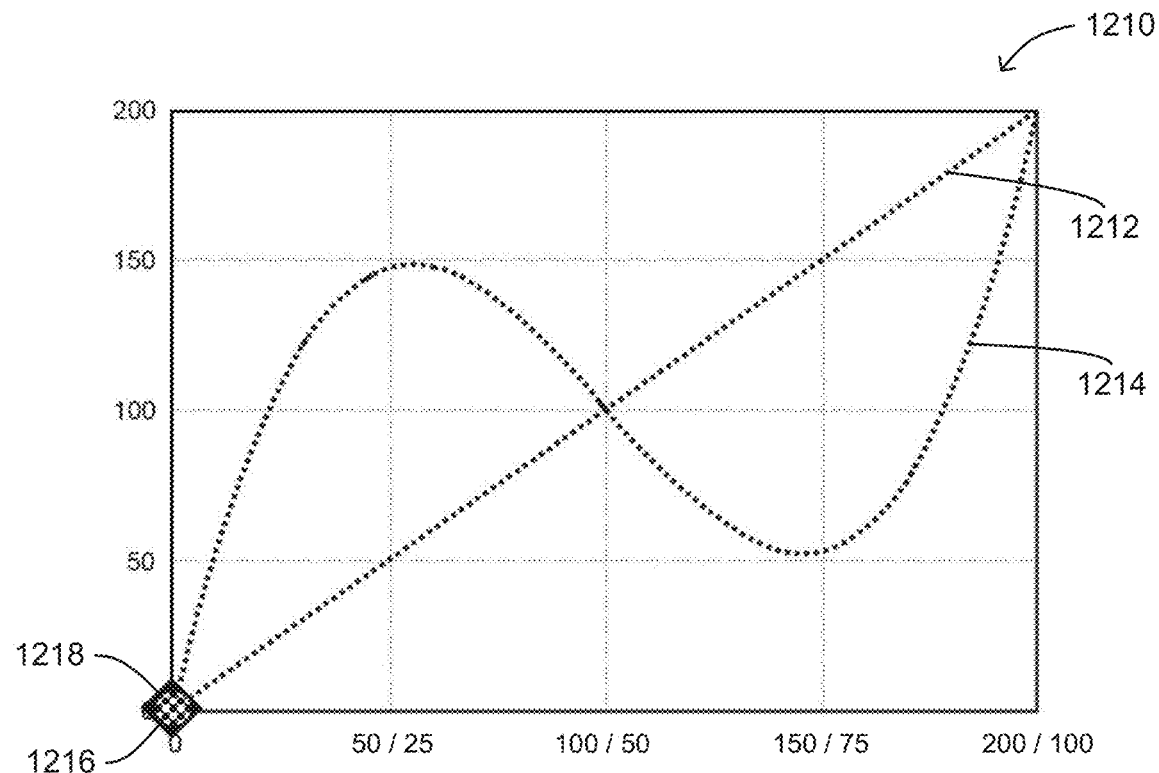

FIG. 12B presents a load-deflection graph 1210 for the shock isolator 600 in the first loaded configuration (or the shock isolator 600 having no elastomer gasket 614 in the unloaded configuration). A dotted line 1212 indicates a combined linear load-deflection response of the disc spring system 618. A dotted line 1214 indicates a non-linear load-deflection response of the non-linear first disc spring 606. Icon 1216 indicates a current combined deflection of the disc spring system 618. Icon 1218 indicates a current deflection of the first disc spring 606. The icons 1216 and 1218 indicate that there is zero deflection in the configuration shown in FIG. 12A. The icons 1216 and 1218 are individually distinguishable in FIGS. 13B and 15B.

Figure 13A:
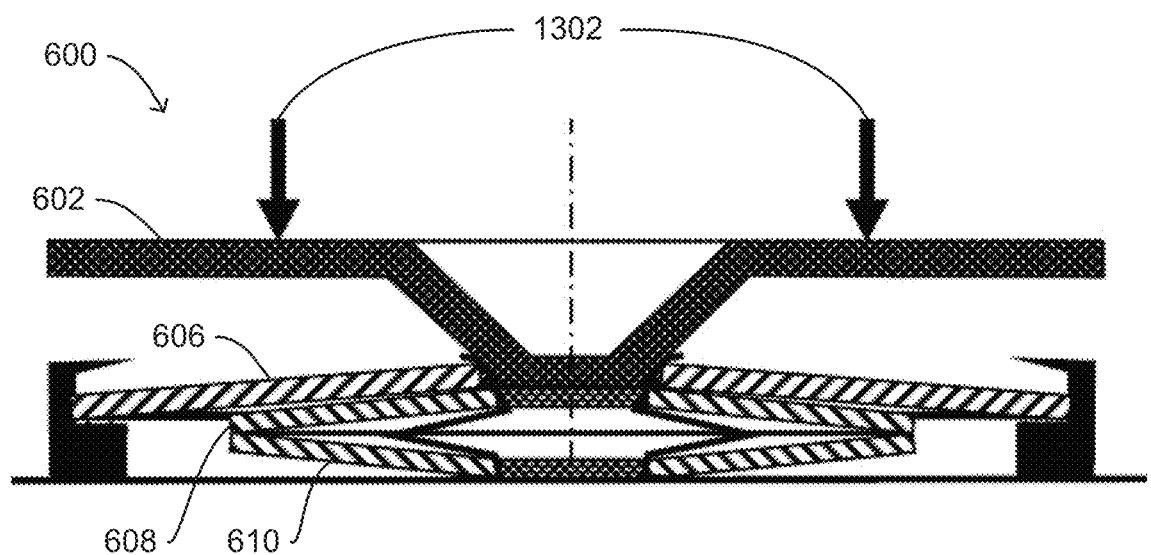

FIG. 13A shows a second loaded configuration of the shock isolator 600 (or a first loaded configuration of the shock isolator 600 having no elastomer gasket 614). An axial shock load 1302 (greater than the axial shock load 1202 of FIG. 12A) has been applied to the ACE 602, which has caused the first disc spring 606 and the disc spring system 618 to deflect over a distance that is equal to 50% deflection to flat of the first disc spring 606 and 25% deflection to flat of the disc spring system 618. The inner portion of the concave side of the first disc spring 606 has applied force to the inner portion of the convex side of the second disc spring 608, causing the second disc spring 608 to deflect. Further, the outer rim of the second disc spring 608 has applied force to the outer rim of the third disc spring 610, causing the third disc spring 610 to deflect.

Figure 13B:
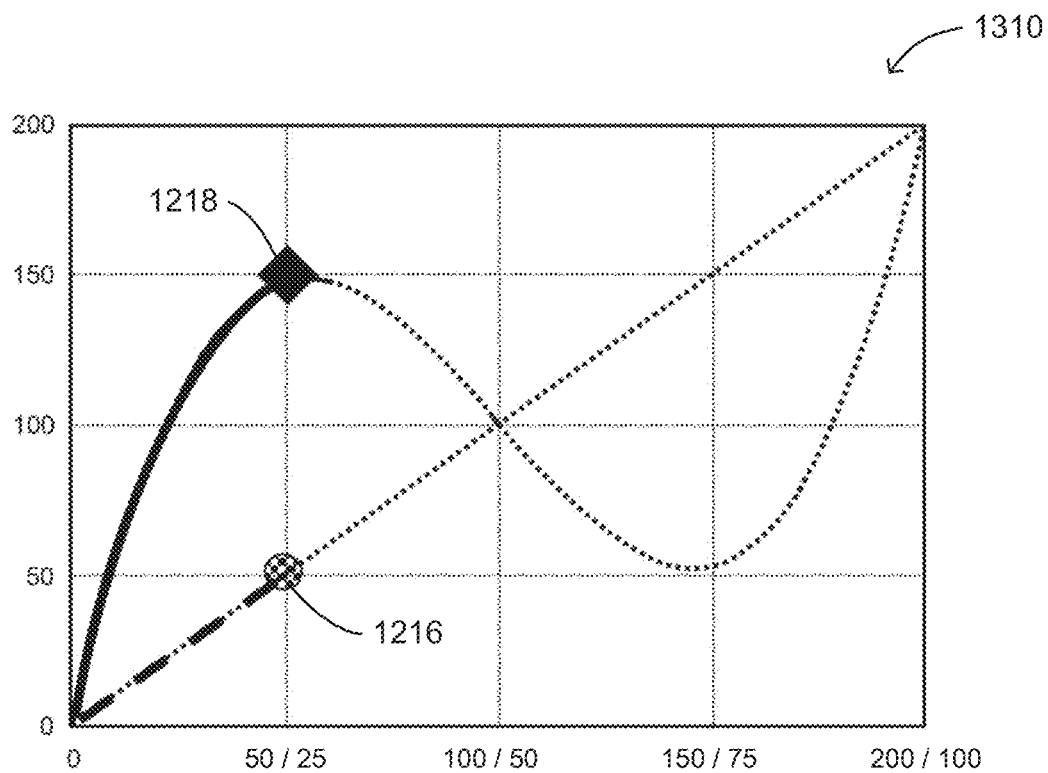

FIG. 13B presents a load-deflection graph 1310 for the shock isolator 600 in the configuration shown in FIG. 13A. The icon 1216 indicates 25% deflection to flat of the disc spring system 618 and the icon 1218 indicates 50% deflection to flat of the first disc spring 606. Further deflection of the first disc spring 606 will take it into its instability region.

Figure 14A:
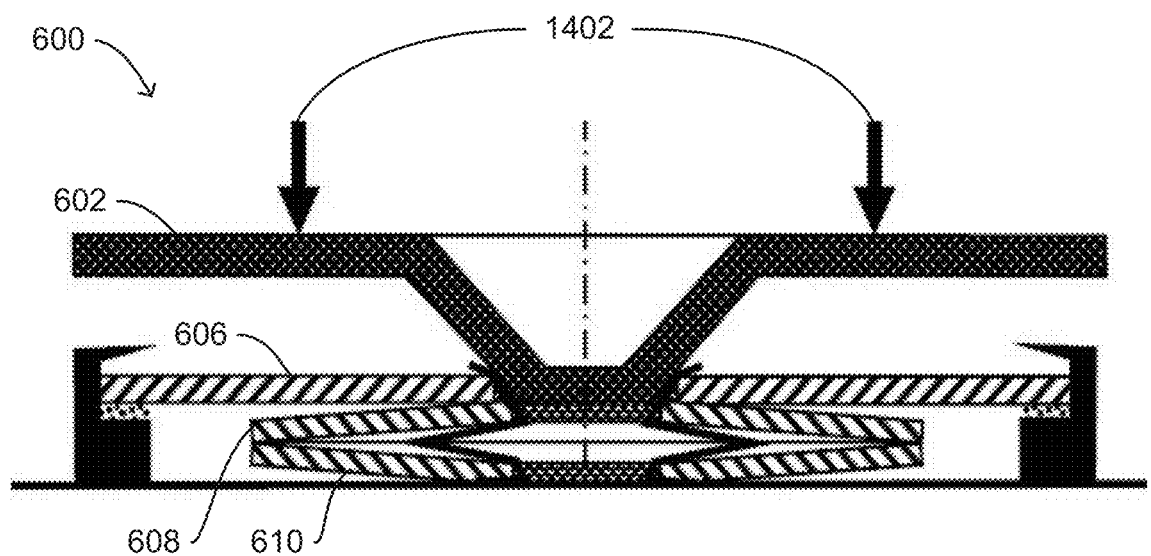

FIG. 14A shows a third loaded configuration of the shock isolator 600 (or a second loaded configuration of the shock isolator 600 having no elastomer gasket 614). An axial shock load 1402 (greater than the axial shock load 1302 of FIG. 13A) has been applied to the ACE 602, which has caused the first disc spring 606 and the disc spring system 618 to deflect over a distance that is equal to 100% deflection to flat of the first disc spring 606 and 50% deflection to flat of the disc spring system 618.

Figure 14B:
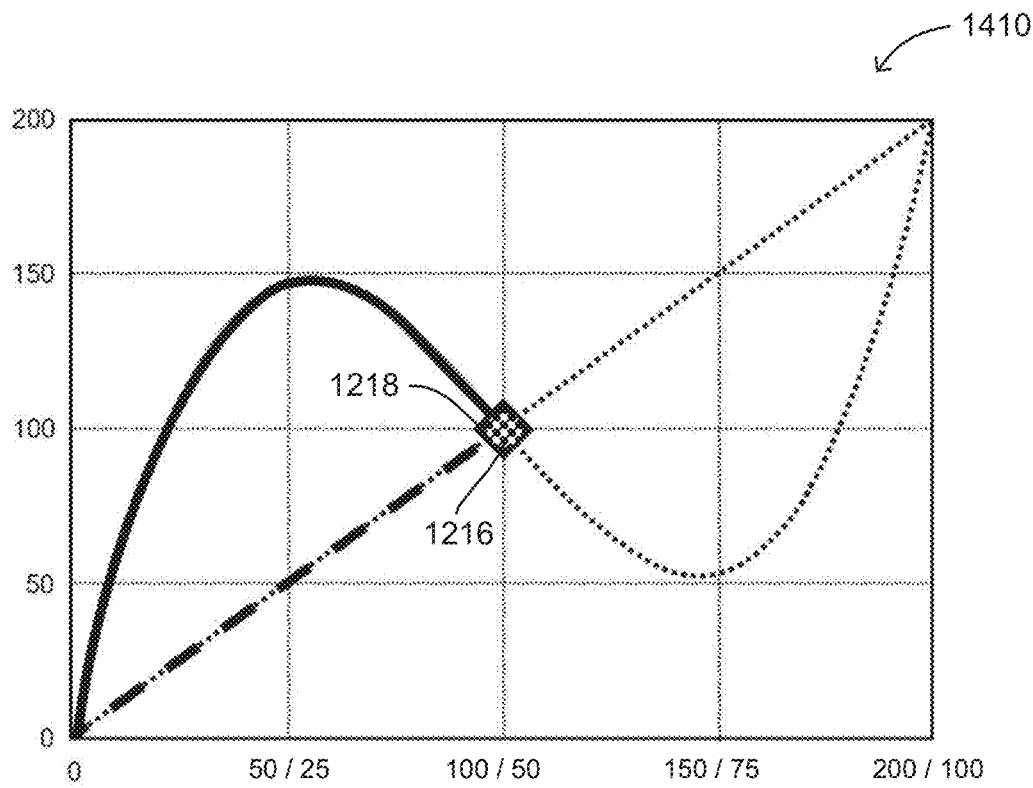

FIG. 14B presents a load-deflection graph 1410 for the shock isolator 600 in the configuration of FIG. 14A. The icon 1216 indicates 50% deflection to flat of the disc spring system 618 and the icon 1218 indicates 100% deflection to flat of the first disc spring 606.

Figure 15A:
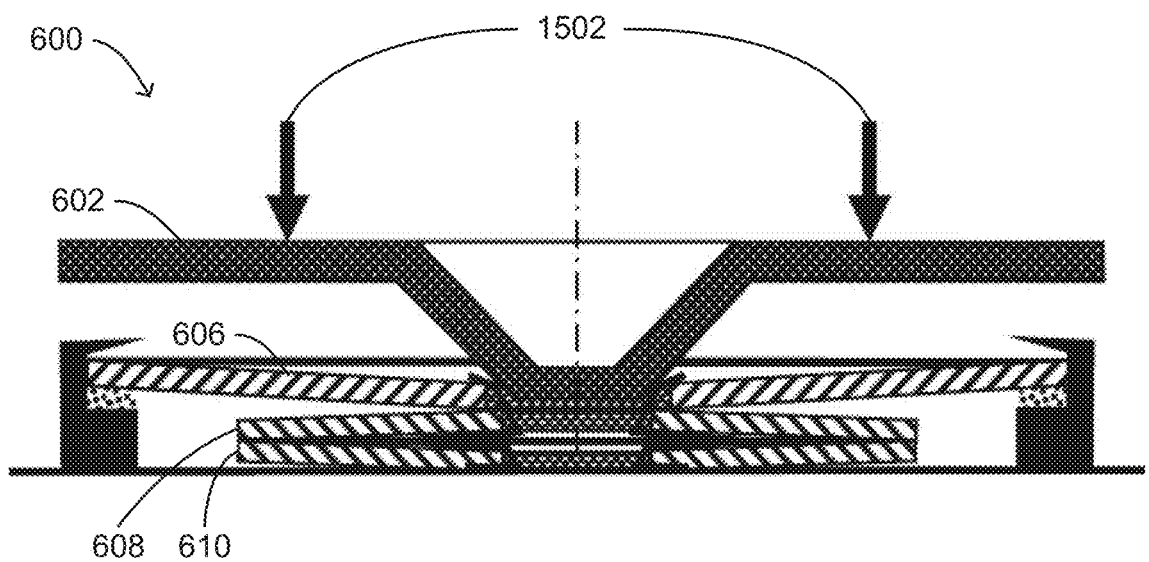

FIG. 15A shows a fourth loaded configuration of the shock isolator 600 (or a third loaded configuration of the shock isolator 600 having no elastomer gasket 614). An axial shock load 1502 (greater than the axial shock load 1402 of FIG. 14A) has been applied to the ACE 602, which has caused the first disc spring 606 and the disc spring system 618 to deflect over a distance that is equal to 150% deflection to flat of the first disc spring 606 and 75% deflection to flat of the disc spring system 618. The first disc spring 606 has snapped-through (or inverted).

Figure 15B:
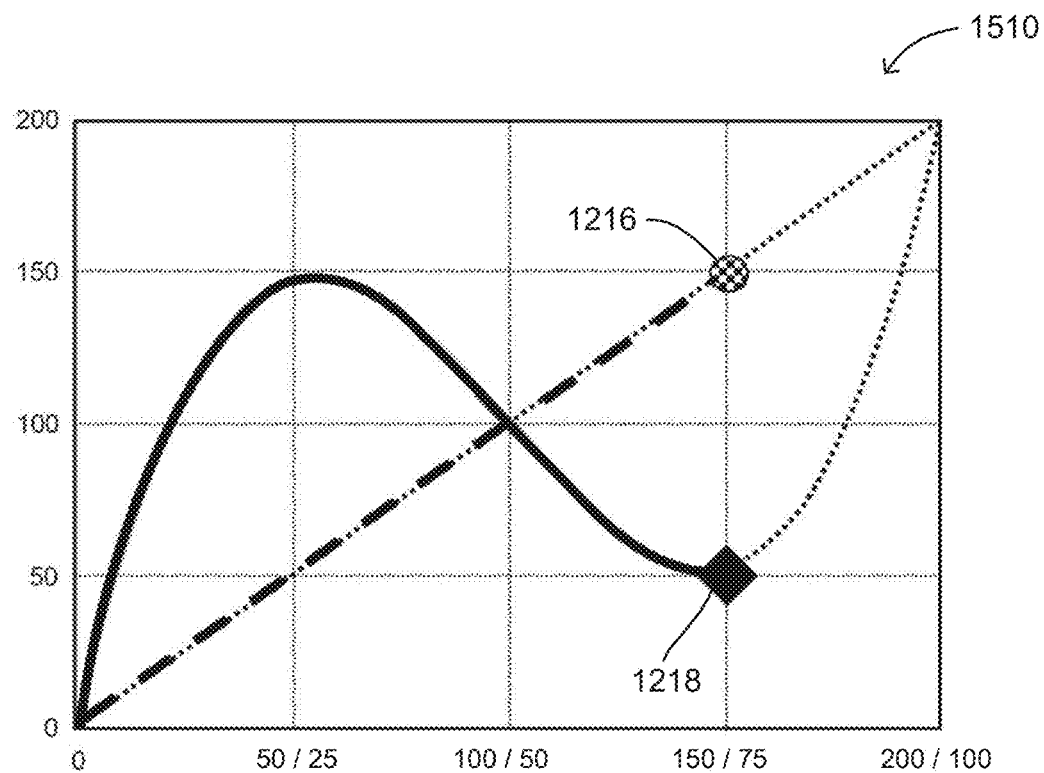

FIG. 15B presents a load-deflection graph 1510 for the shock isolator 600 in the configuration shown in FIG. 15A. The icon 1216 indicates 75% deflection to flat of the disc spring system 618 and the icon 1218 indicates 150% deflection to flat of the first disc spring 606.

FIG. 16A shows a fifth loaded configuration of the shock isolator 600 (or a fourth loaded configuration of the shock isolator 600 having no elastomer gasket 614). An axial shock load 1602 (greater than the axial shock load 1502 of FIG. 15A) has been applied to the ACE 602, which has caused the first disc spring 606 and the disc spring system 618 to deflect over a distance that is equal to 200% deflection to flat of the first disc spring 606 and 100% deflection to flat of the disc spring system 618. No further deflection of the shock isolator 600 is possible because the second and third disc springs 608 and 610 are flattened against the mass 616 and prevent further deflection of the first disc spring 606.

Figure 16B:
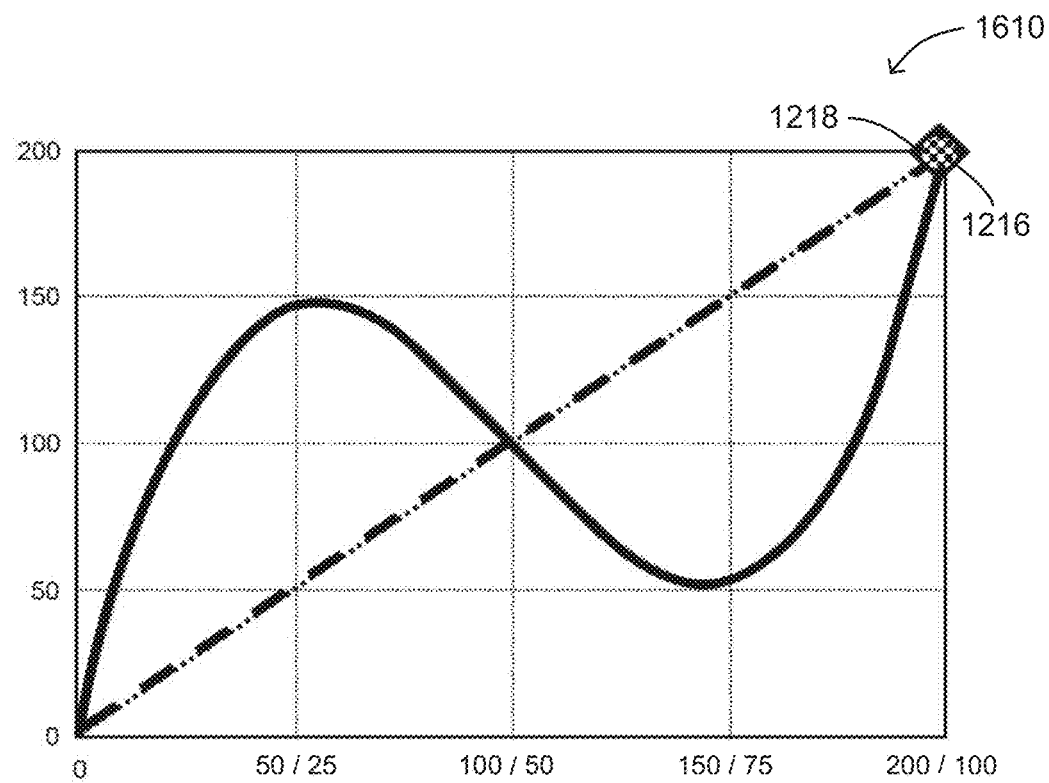

FIG. 16B presents a load-deflection graph 1610 for the shock isolator 600 in the configuration shown in FIG. 16A. The icon 1216 indicates 100% deflection to flat of the disc spring system 618 and the icon 1218 indicates 200% deflection to flat of the first disc spring 606—indicating that the first disc spring 606 has further inverted from the fourth loaded configuration shown in FIG. 15A.

While FIGS. 12A-B through 16A-B describe the shock load being applied to the ACE 602 and the mass 616 to be isolated from the shock load being mechanically coupled to the annular stand-off 612, it will be understood that the shock isolator 600 is reversible. The shock load may be applied to the annular stand-off 612 and the mass 616 mechanically coupled to the ACE 602.

The shock isolator 600 is of the first type of shock isolator according to the disclosure, previously described with reference to FIG. 4. The combined load-deflection curve 406, representative of the combined load-deflection curve of the shock isolator 600 (or the shock isolator 600 having no elastomer gasket 614 and a base height 906 of the annular stand-off 612 that is selected to cause the first disc spring 606 to contact the second disc spring 608 in an unloaded configuration), is presented in FIG. 4. The first disc spring 606 has an h/t ratio of approximately $\sqrt{5}$, however other embodiments of the first type of shock isolator may use a first disc spring 606 with a height-to-thickness ratio of another value greater than or equal to $\sqrt{2}$, resulting in a non-linear load-deflection curve different than the non-linear load-deflection response as shown by dotted line 1214 shown in FIG. 12B. Similarly, while the second and third disc springs 608 and 610 have an h/t ratio of approximately zero, other embodiments of the first type may have linear disc springs (as defined herein) with values of h/t that are greater than zero but less than $\sqrt{2}$. Such linear disc springs would exhibit a load-deflection curve different than the combined linear load-deflection response shown in dotted line 1212 shown in FIG. 12B. The load-deflection curve for such linear disc springs would have some curvature and not be 'linear' in the conventional sense of the term. Still other embodiments may have only a single linear disc spring or three or more disc springs. Any of these differences in other embodiments could result in a combined load-deflection curve different than the load-deflection curve 406 shown in FIG. 4.

Still other embodiments of shock isolators of the first type according to the disclosure may have other changes to elements of the shock isolator 600. In some embodiments, no elastomer gasket 614 is included. In some such embodiments, the annular stand-off 612 has a base height 906 that is selected to cause the first disc spring 606 to contact the second disc spring 608 in an unloaded configuration. Such embodiments will exhibit the load-deflection curve 406 shown in FIG. 4.

Two other embodiments having changes to elements of the shock isolator 600 will exhibit a combined load-deflection curve different than the load-deflection curve 406 shown in FIG. 4. In both the following embodiments, the non-linear first disc spring 606 begins deflecting before the linear disc spring system 618 begins deflecting. As such, the load-deflection curve 402 of the first disc spring 606 will be as shown in the load-deflection graph 400, but the load-deflection curve 404 of the disc spring system 618 will be shifted to the right, indicating that deflection of the disc spring system 618 begins after deflection of the first disc spring 606. This will result in a change to the combined load-deflection curve 406, including a shift to the right of the deflection range of the constant load region 408 and, in some embodiments, a change in the load value of the constant load region 408.

In one such embodiment, the annular stand-off 612 has a base height 906 that is selected to be sufficiently high to cause, in response to an initial load, the elastomer gasket 614 to fully compress and the first disc spring 606 to deflect by a first amount before the first disc spring 606 contacts the second disc spring 608. In response to an additional load, both the first disc spring 606 and the disc spring system 618 deflect, the first disc spring 606 deflecting by a second amount and causing the disc spring system 618 to deflect by a third amount.

In another such embodiment, no elastomer gasket 614 is included and the annular stand-off 612 has a base height 906 that is selected to configure the first disc spring 606 to be spaced apart from the second disc spring 608 in an unloaded configuration. In response to an initial load, the first disc spring 606 deflects by a first amount before the first disc spring 606 contacts the second disc spring 608. In response to an additional load, both the first disc spring 606 and the disc spring system 618 deflect, the first disc spring 606 deflecting by a second amount and causing the disc spring system 618 to deflect by a third amount.

Figure 17:
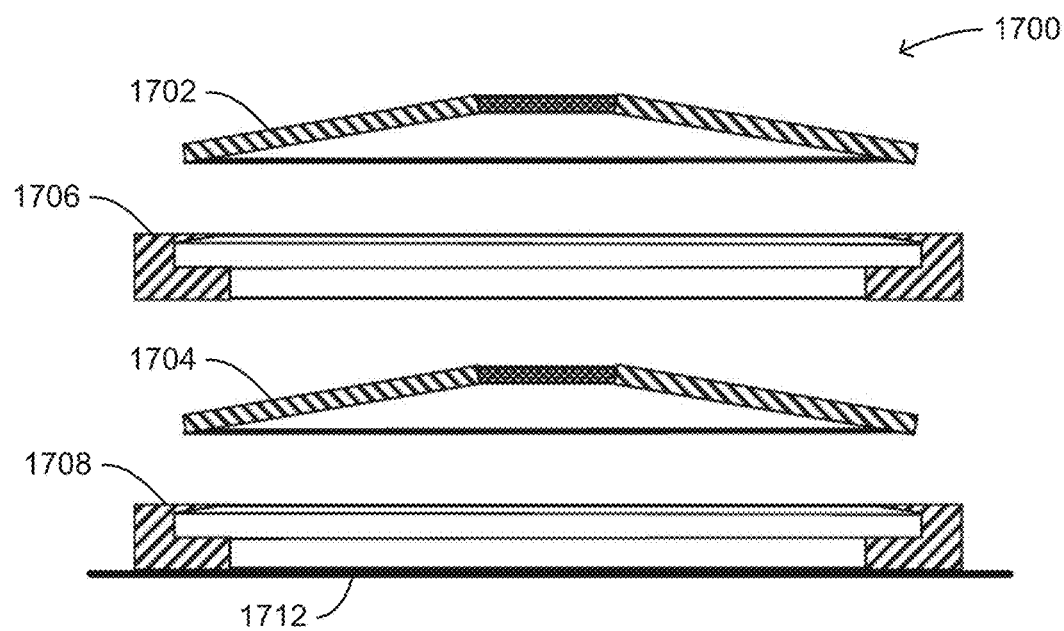
FIG. 17 presents an exploded cross-section view of a shock isolator of the second type according to the disclosure.
Figure 20A:
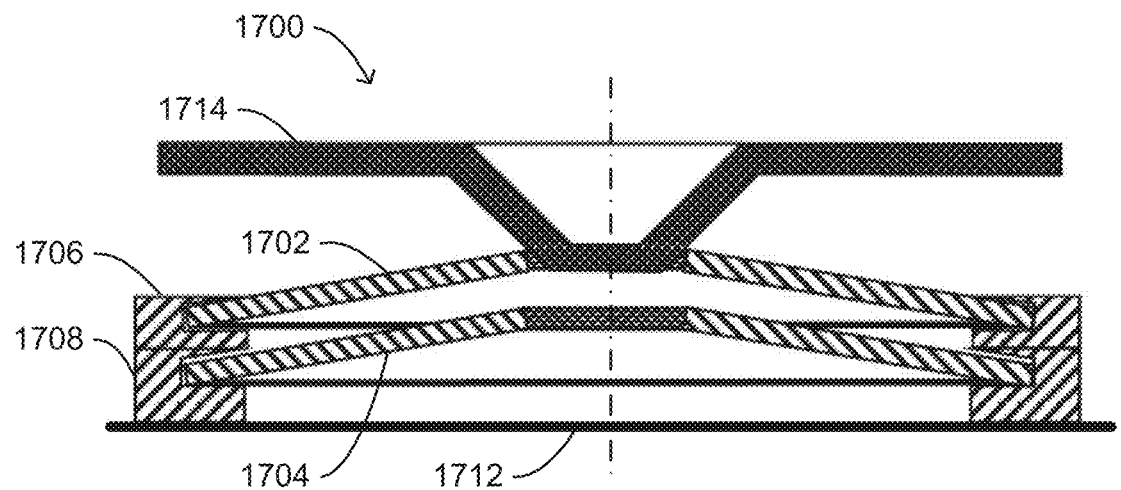
FIGS. 20A-B through 23A-B present configurations and load-deflection graphs of the shock isolator of FIG. 17 under increasing amounts of deflection.

FIG. 17 presents an exploded cross-section view of a shock isolator 1700 of a second type according to the disclosure. The shock isolator 1700 includes non-linear first and second disc springs 1702 and 1704, and rigid first and second annular stand-offs 1706 and 1708. When the shock isolator 1700 is assembled (as shown in FIG. 20A), the first disc spring 1702 is mounted in the first annular stand-off 1706 and the second disc spring 1704 is mounted in the second annular stand-off 1708. The second annular stand-off 1708 is mechanically coupled to a mass 1712 to be isolated from a shock load.

In some embodiments, one or both of the first and second disc springs 1702 and 1704 rest on elastomer gaskets within the corresponding first and second annular stand-offs 1706 and 1708, similar to the elastomer gasket 614 described with reference to FIG. 6. Elastomer gaskets may be used to improve a durability of the first and second disc springs 1702 and 1704, especially where the disc springs have experienced multiple shock events. The elastomer gaskets may cushion a portion of the shock energy transferred to discs that are thin and/or are fabricated from a material that is less ductile than a metal and less able to absorb the tensile and compressive forces that occur while the disc is deflecting under a shock load.

In applications where a weight of the shock isolator 1700 is an important design criterion, the first and second disc springs 1702 and 1704 may be fabricated from fiber-reinforced polymer composite materials, which can be sensitive to the rate of strain associated with shocks, suggesting the use of elastomer gaskets to reduce the degree of shock loading directly experienced by such disc springs. The weight of the shock isolator 1700 may be reduced even further by using an elastomer gasket under only the first disc spring 1702, as that is the spring that receives the initial shock load.

Figures 18A, 18B, 19:
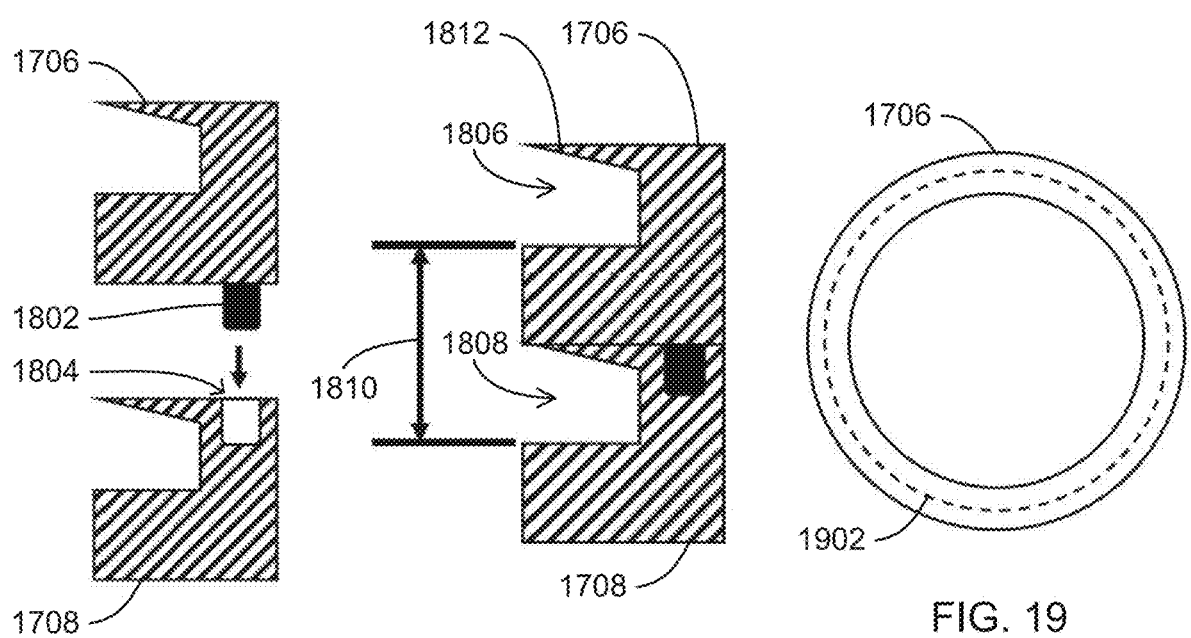
FIGS. 18A-B present detail cross-section views of the first and second annular stand-offs of the shock isolator of FIG. 17.
FIG. 19 presents a hidden line plan view of the annular stand-off of the shock isolator of FIG. 17.

FIGS. 18A-B present detail cross-section views of the first and second annular stand-offs 1706 and 1708 of the shock isolator 1700 of FIG. 17. FIG. 18A present a detail exploded cross-section view. The first annular stand-off 1706 is designed to stack on the second annular stand-off 1708. The first annular stand-off 1706 includes a pin protrusion 1802 extending from a lower surface and the second annular stand-off 1708 includes a corresponding cavity 1804 in an upper surface that is configured to receive the pin protrusion 1802. Such pins and cavities may be spaced in corresponding positions radially around the first and second annular stand-offs 1706 and 1708, respectively, to secure and coaxially align the first and second annular stand-offs 1706 and 1708 when stacked. In other embodiments, the lower surface of the first annular stand-off 1706 includes an annular ring protrusion and the upper surface of the second annular stand-off 1708 includes a corresponding annular slot in the upper surface. Still other embodiments may include other structures suitable to secure and coaxially align the first and second annular stand-offs 1706 and 1708, preventing them from moving relative to each other perpendicularly to an axis of deflection when stacked.

FIG. 18B presents a detail assembled cross-section view of the first and second annular stand-offs 1706 and 1708. The first annular stand-off 1706 has been stacked on the second annular stand-off 1708, with the pin 1802 received in the cavity 1804. A recess 1806 in the first annular stand-off 1706 is configured to receive an outer edge of the first disc spring 1702. A recess 1808 in the second annular stand-off 1708 is configured to receive an outer edge of the second disc spring 1704. The dimensions of the first and second annular stand-offs 1706 and 1708 are selected so that a distance 1810 between a bottom surface of the recess 1806 and a bottom surface of the recess 1808 provides a separation between the first disc spring 1702 and the second disc spring 1704 that is configured to cause the first disc spring 1702 to contact the second disc spring 1704 at a desired amount of deflection of the first disc spring 1702. When elastomer gaskets are used in one or both of the recesses 1806 and 1808, the distance 1810 is measured from the top of the elastomer gasket or the bottom surface of the recess, as appropriate.

As described for the annular stand-off 612 of the shock isolator 600, an upper edge 1812 of the first annular stand-off 1706 may be flexible, to enable insertion of the first disc spring 1702 into the first annular stand-off 1706 and to ensure retention of the first disc spring 1702 in the first annular stand-off 1706. In some embodiments, the second annular stand-off 1708 includes a similar flexible upper edge. In other embodiments, the second annular stand-off 1708 includes no upper edge and the lower surface of the first annular stand-off 1706 forms an upper surface of the recess 1808 and ensures retention of the first disc spring 1702 in the first annular stand-off 1706.

FIG. 19 presents a hidden line plan view of the first annular stand-off 1706 of the shock isolator 1700 of FIG. 17. A dotted line 1902 indicates an inner wall of the recess 902.

FIGS. 20A-B through 23A-B present configurations and load-deflection graphs of the shock isolator 1700 of FIG. 17 under increasing amounts of deflection. FIG. 20A shows an assembled cross-section view of the shock isolator 1700 in an unloaded configuration, with the addition of an ACE 1714. An outer edge of the first disc spring 1702 is mechanically coupled to the first annular stand-off 1706 and an outer edge of the second disc spring 1704 is mechanically coupled to the second annular stand-off 1708. The second annular stand-off 1708 is mechanically coupled to the first annular stand-off 1706 and to the mass 1712. The first and second annular stand-offs 1706 and 1708 are configured to hold the first and second disc springs 1702 and 1704 in a spaced-apart parallel configuration. The first and second disc springs 1702 and 1704 and the first and second annular stand-offs 1706 and 1708 are coaxially mounted.

As described for the ACE 602 of the shock isolator 600, the ACE 1714 has a frustopyramidal central portion with a defined angle and height that are chosen to prevent the central portion protruding beyond the thickness of the first disc spring 1702 and making contact with the second disc spring 1704. The defined angle may be chosen based upon a thickness of the first disc spring 1702 and/or a diameter of a central aperture of the first disc spring 1702—which can vary depending on the application. The defined angle may fall into a range of angles between a maximum value and a minimum value. The ACE 1714 is seated into the aperture of the first disc spring 1702 and stays positioned there during compression of the discs in the shock isolator 1700. In some embodiments of the shock isolator 1700, the flat apex of the frustopyramidal central portion of the ACE 1714 is wide enough to mechanically couple with a portion of the top surface of the first disc spring 1702 surrounding its central aperture, rather than being seated into the aperture of the first disc spring 1702.

Figure 20B:
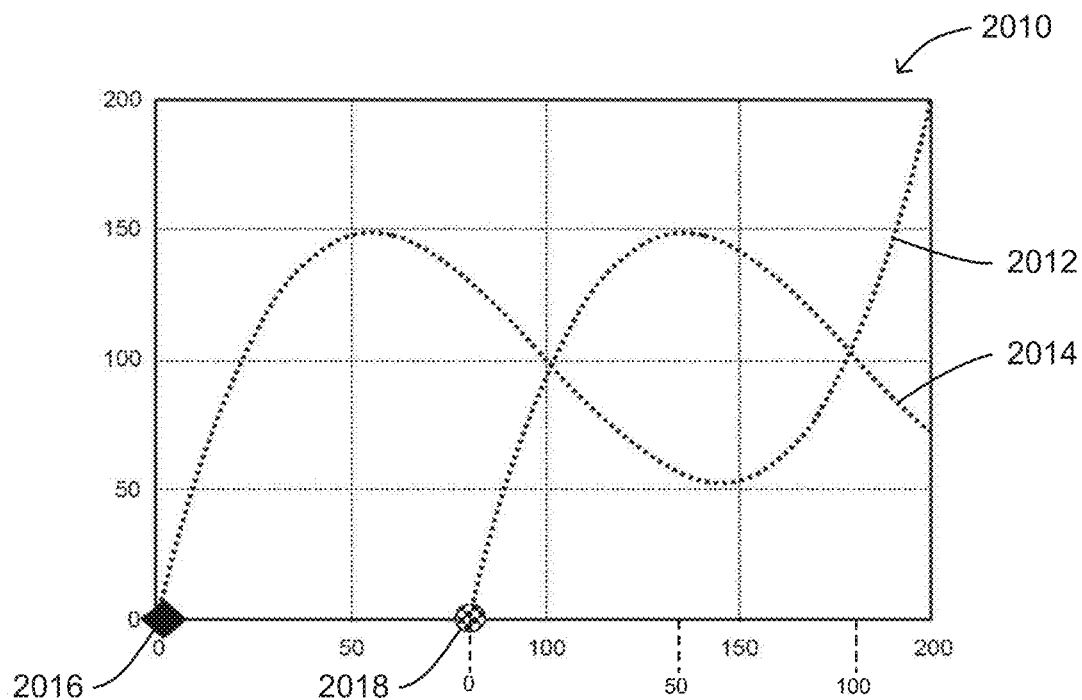

FIG. 20B presents a load-deflection graph 2010 for the shock isolator 1700 in the unloaded configuration. A dotted line 2012 indicates a non-linear load-deflection response of the first disc spring 1702. A dotted line 2014 indicates a non-linear load-deflection response of the second disc spring 1704. Icon 2016 indicates that the first disc spring 1702 is not deflected in the unloaded configuration. Icon 2018 indicates that the second disc spring 1704 also is not deflected in the unloaded configuration.

As described above with reference to FIG. 5, because the shock isolator 1700 includes two non-linear disc springs, two scales appear on the horizontal deflection axes in FIGS. 20B, 21B, 22B, and 23B. The first non-linear disc spring experiences 200% deflection, which is represented in a first scale of the axis. The second non-linear disc spring experiences approximately 0% to 120% deflection and its percentage of deflection is represented in a second scale of the axis.

Figure 21A:
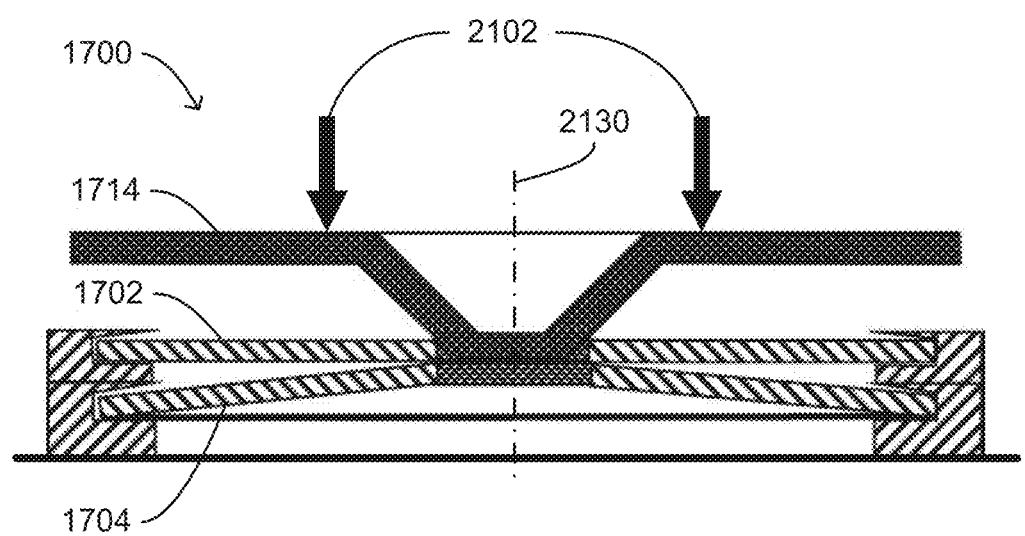

FIG. 21A shows a first loaded configuration of the shock isolator 1700. An axial shock load 2102 has been applied to the ACE 1714 along an axis of deflection 2130, causing the first disc spring 1702 to deflect over a distance that is equal to 100% deflection to flat. In embodiments where the first disc spring 1702 rests on a first elastomer gasket, the first elastomer gasket fully compresses before the first disc spring 1702 begins to deflect to flat. The first disc spring 1702 has come into contact with the second disc spring 1704 and caused the second disc spring 1704 to deflect over a second distance, which is less than the first distance. In embodiments where the second disc spring 1704 rests on a second elastomer gasket, the second elastomer gasket fully compresses before the second disc spring 1704 begins to deflect.

Figure 21B:
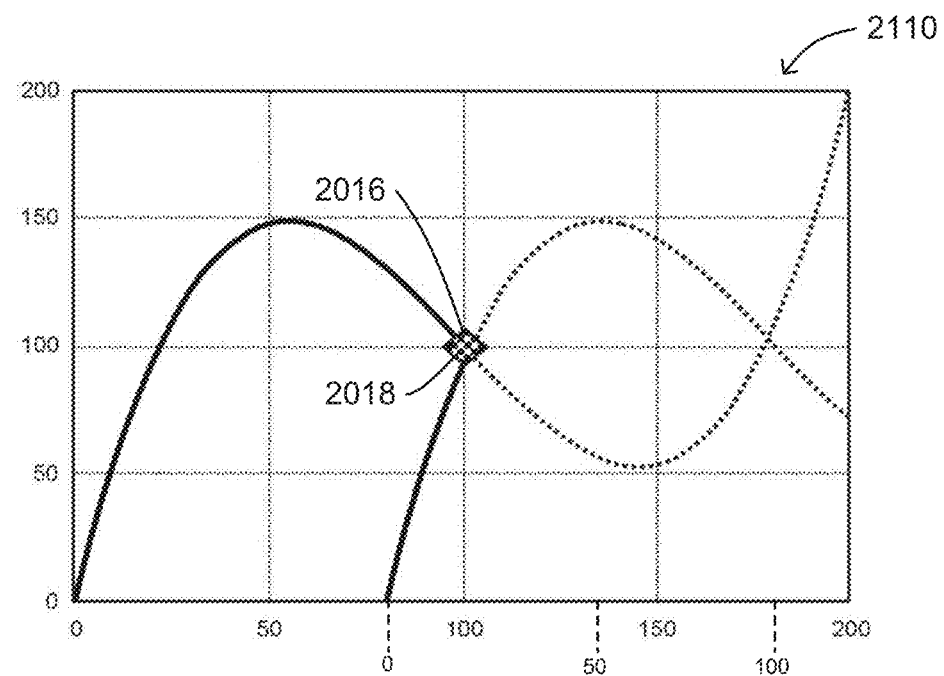

FIG. 21B presents a load-deflection graph 2110 for the shock isolator 1700 in the first loaded configuration. Icons 2016 and 2018 are superimposed in the center of the load-deflection graph 2110, indicating that the first disc spring 1702 is at 100% deflection, while the second disc spring 1704 is about 20% deflected.

Figure 22A:
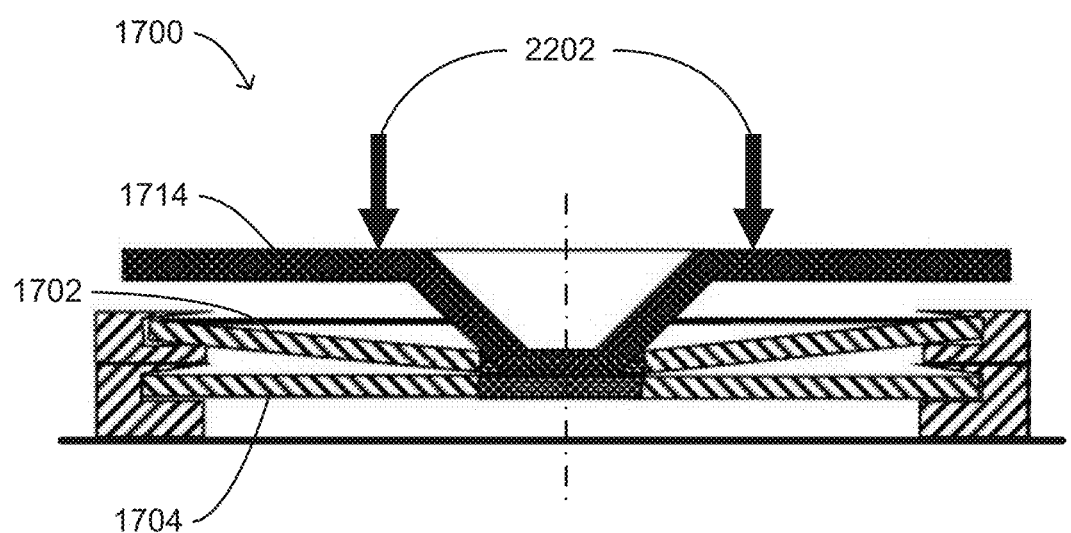

FIG. 22A shows a second loaded configuration of the shock isolator 1700. An axial shock load 2202 (greater than the axial shock load 2102 of FIG. 21A) has been applied to the ACE 1714, causing the first disc spring 1702 to deflect by an additional second distance, deflecting past flat. The first disc spring 1702 has caused the second disc spring 1704 to deflect by the same second distance, deflecting to flat.

Figure 22B:
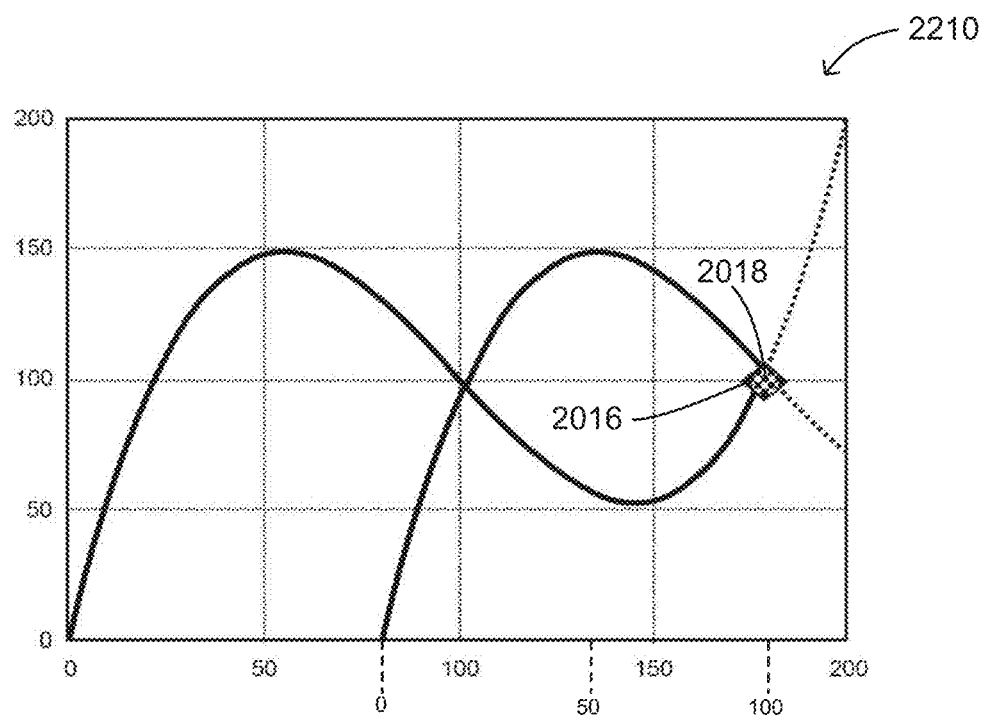

FIG. 22B presents a load-deflection graph 2210 for the shock isolator 1700 in the second loaded configuration. Icons 2016 and 2018 are again superimposed in the load-deflection graph 2210, indicating that the first disc spring 1702 is about 180% deflected, and the second disc spring 1704 is 100% deflected.

Figure 23A:
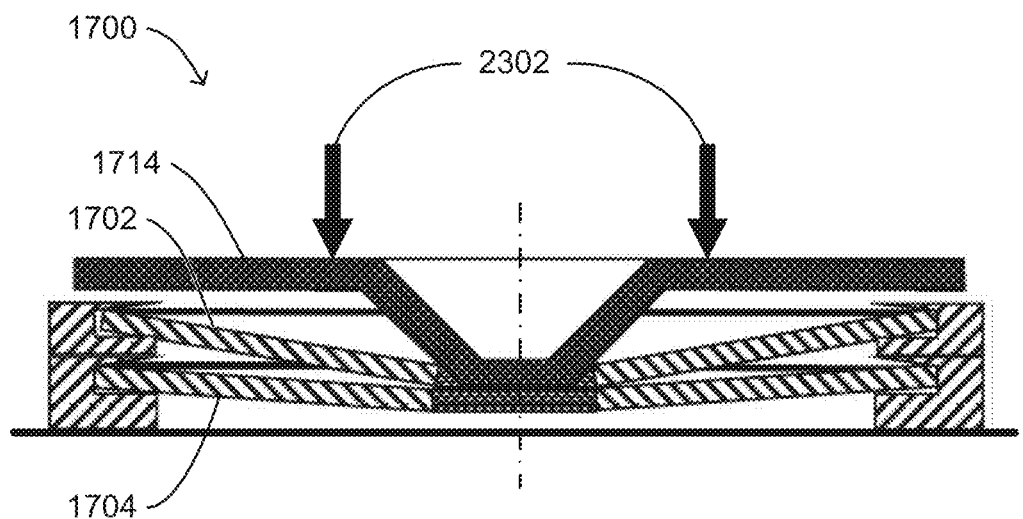

FIG. 23A shows a third loaded configuration of the shock isolator 1700. An axial shock load 2302 (greater than the axial shock load 2202 of FIG. 22A) has been applied to the ACE 1714, causing the first disc spring 1702 to deflect by an additional third distance, deflecting to fully inverted. The first disc spring 1702 has caused the second disc spring 1704 to deflect by the same third distance, deflecting to a partially inverted configuration.

Figure 23B:
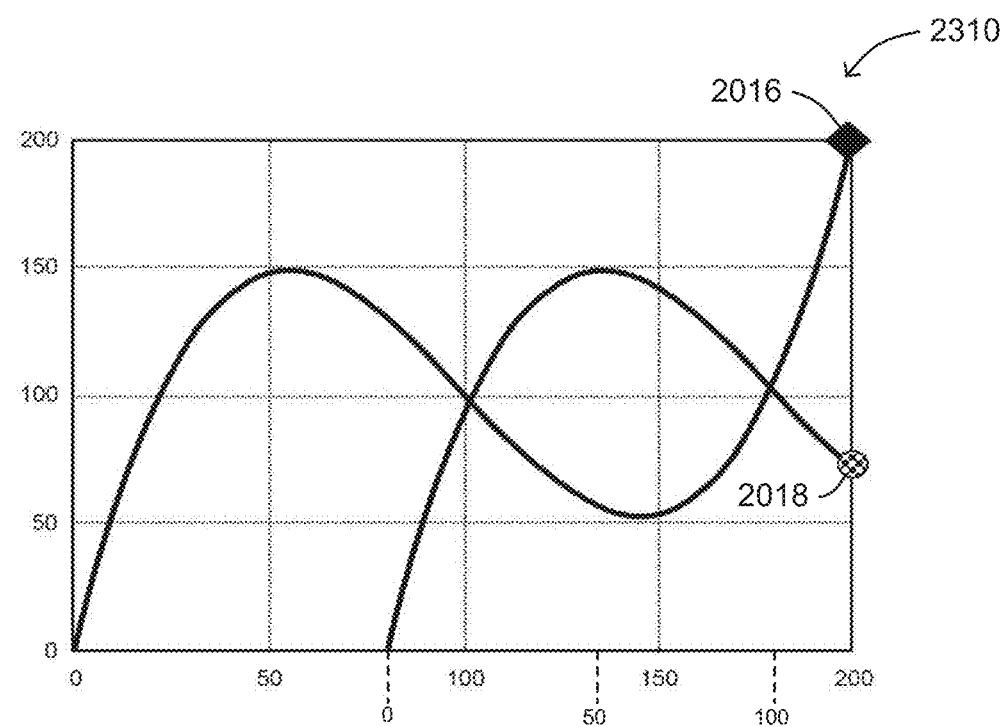

FIG. 23B presents a load-deflection graph 2310 for the shock isolator 1700 in the third loaded configuration. Icon 2016 indicates that the first disc spring 1702 is at full 200% deflection. Icon 2018 indicates that the second disc spring 1704 is at about 120% deflected.

The shock isolator 1700 is of the second type of shock isolator according to the disclosure, previously described with reference to FIG. 5. The combined load-deflection curve 506, representative of the combined load-deflection curve of the shock isolator 1700, is presented in FIG. 5. Both the first and second disc springs 1702 and 1704 have an h/t ratio of approximately $\sqrt{5}$, however other embodiments of the second type of shock isolator may use disc springs with height-to-thickness ratios of other values greater than or equal to $\sqrt{2}$, resulting in non-linear load-deflection curves different than the responses 2012 and 2014 shown in FIG. 20A and a different combined load-deflection curve than the combined load-deflection curve 506 shown in FIG. 5. While the first and second disc springs 1702 and 1704 have approximately equal h/t ratios and load-deflection curves, other embodiments may use disc springs having h/t ratios and load-deflection curves that are not the same, resulting in non-linear load-deflection curves different than the responses 2012 and 2014 shown in FIG. 20A and a different combined load-deflection curve than the combined load-deflection curve 506 shown in FIG. 5.

As described for the shock isolator 600, the shock isolator 1700 is also reversible. The shock load may be applied to the second annular stand-off 1708 and the mass 1712 mechanically coupled to the ACE 1714 in such a reversed application.

Figure 24:
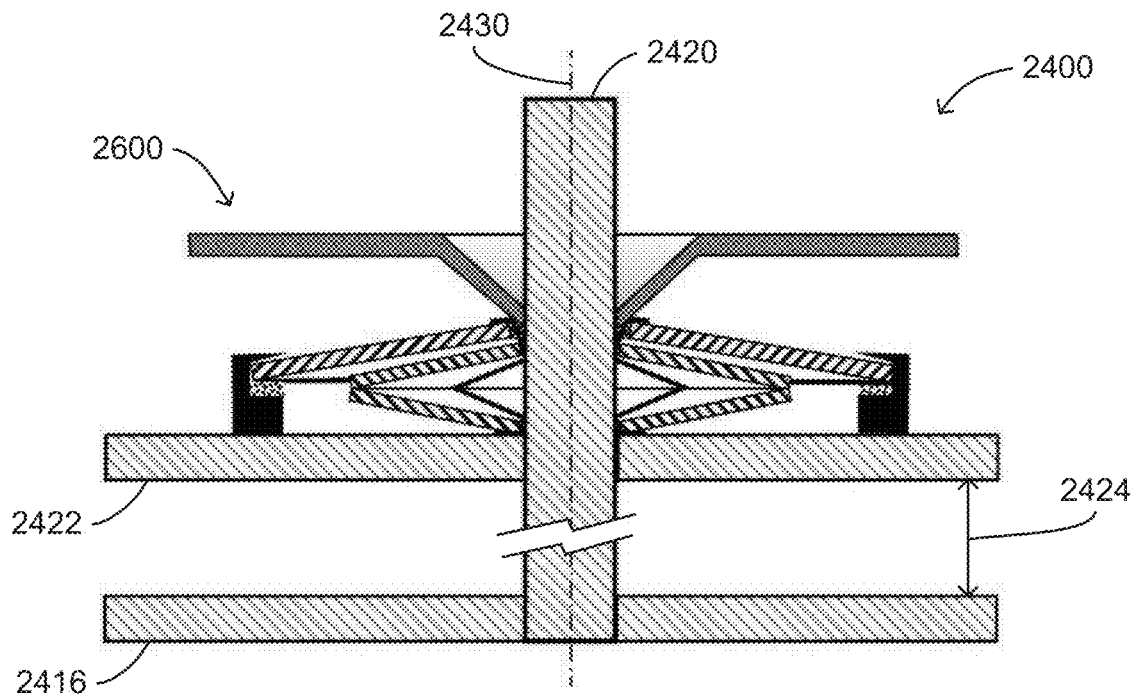
FIG. 24 presents a cross-section view of a third shock isolator system according to the disclosure.

FIG. 24 presents a cross-section view of a third shock isolator system 2400 according to the disclosure. The shock isolator system 2400 includes a rod 2420 extending through a shock isolator 2600 (similar to the shock isolator 600 described with reference to FIGS. 6-16B) and a plate 2422 into a mass 2416 to be isolated from a shock load. The rod 2420 is fixedly mounted to the mass 2416. In some embodiments, the rod 2420 is fabricated as a part of the mass 2416.

The shock isolator 2600 and the plate 2422 surround and are free to slide along a longitudinal axis 2430 of the rod 2420. The longitudinal axis 2430 is also an axis of deflection of the shock isolator 2600 and the shock isolator system 2400. When a shock load is applied to the shock isolator 2600, a distance 2424 between the plate 2422 and the mass 2416 may change. A coil spring or some other device for absorbing force or shock may be positioned between the plate 2422 and the mass 2416. When the coil spring or other device has a higher stiffness than the shock isolator 2600, the shock isolator 2600 may absorb an initial shock load, before beginning to compress the coil spring or other device.

Figure 25:
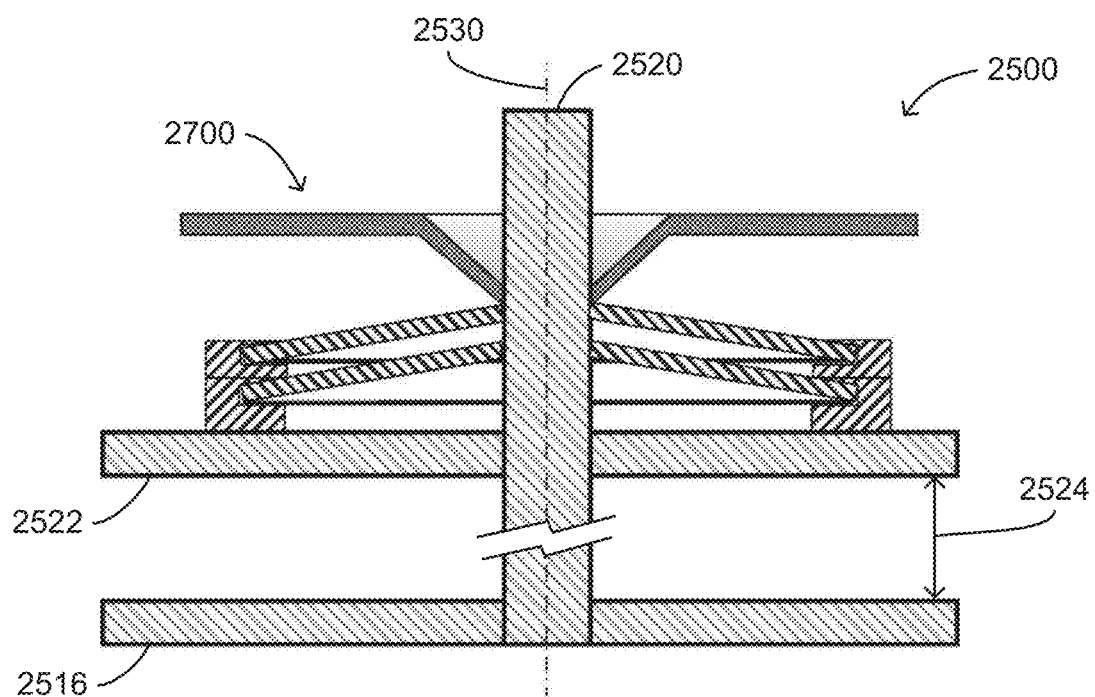
FIG. 25 presents a cross-section view of a fourth shock isolator system according to the disclosure.

FIG. 25 presents a cross-section view of a fourth shock isolator system 2500 according to the disclosure. The shock isolator system 2500 includes a rod 2520 extending through a shock isolator 2700 (similar to the shock isolator 1700 described with reference to FIGS. 17-23B) and a plate 2522 into a mass 2516 to be isolated from a shock load. The rod 2520 is fixedly mounted to the mass 2516. In some embodiments, the rod 2520 is fabricated as a part of the mass 2516.

The shock isolator 2700 and the plate 2522 surround and are free to slide along a longitudinal axis 2530 of the rod 2520. The longitudinal axis 2530 is also an axis of deflection of the shock isolator 2700 and the shock isolator system 2500. When a shock load is applied to the shock isolator 2700, a distance 2524 between the plate 2522 and the mass 2516 may change. A coil spring or some other device for absorbing force or shock may be positioned between the plate 2522 and the mass 2516. When the coil spring or other device has a higher stiffness than the shock isolator 2700, the shock isolator 2700 may absorb an initial shock load, before beginning to compress the coil spring or other device.

In some embodiments, one or more shock isolators according to the disclosure may be mounted between an outer shell of a helmet and an inner shell of the helmet, to isolate the inner shell and the head of a person wearing the helmet from shock loads applied to the outer shell. As noted above, shock isolators according to the disclosure are reversible and may be mounted in either orientation relative to the outer shell and inner shell of the helmet.

In other embodiments, one or more shock isolators according to the disclosure may be mounted in the sole of a shoe or boot to protect the wearer's foot from shocks applied to the sole. Shock isolators according to the disclosure may be mounted in protective clothing, padding, shields, or the like, such as shin guards, forearm pads, elbow pads, knee pads, thigh pads, chest pads, and other types of padding used in football, hockey, baseball, mountain biking, motorcycling, or other sporting activities. Shock isolators according to the disclosure may be mounted in police and military protection gear. Shock isolators according to the disclosure may provide improvements in shock and vibration damping in snow boards, skate boards, skis, and other planar sporting equipment. Shock isolators according to the disclosure may be used in side-wall panels, bumpers and other structural elements of commercial and military vehicles for protection against impacts by objects and/or shock waves due to impulse energies transmitted by explosive events.

Suitable materials for disc springs in shock isolators according to the disclosure include (i.e., are not limited to):
Metals: Metallic discs having isotropic properties (mechanical, thermal or physical properties equivalent in all directions).
Orthotropic Composites: Composites that are orthotropic (e.g., have mechanical, thermal or physical properties that are directional, based on the orientations of reinforcement at the individual ply level). Suitable orthotropic composites may involve two kinds of components: a matrix and one or more types of reinforcements to the matrix.
Matrix examples for disc springs include polymeric matrices (thermoplastic and thermosetting polymers) and metal matrices.
Reinforcement examples include particles (metallic or non-metallic), discontinuous fibers and continuous fibers. Fiber types include metal, carbon, glass and/or polymeric (e.g. Kevlar, nylon, polyethylene, and other suitable polymers).
Hybrid Composites: Composites that include layers (discrete plies) of different materials such as various combinations of metallic layers and composite layers. Such hybrid composites may be referred to as FMLs (Fiber Metal Laminates). Such laminates include discrete layers in various combinations including metallic layers with composite plies that may be carbon, glass, or polymer fiber-reinforced composite materials. Another suitable hybrid composite is an elastomer layer combined as a discrete ply within an FML or a Polymer Composite Laminate (PCL).

What is claimed is:
1. A shock isolator comprising:
an axial compression element (ACE);
a first disc spring mechanically coupled to and coaxial with the ACE and configured to be deflected by the ACE, the first disc spring having a first non-linear load-deflection response;
a first annular stand-off mechanically coupled to an outer edge of the first disc spring, the first annular stand-off coaxial with the first disc spring;
a second disc spring coaxial with the first disc spring and configured to be deflected by direct contact with the first disc spring, the second disc spring having a second non-linear load-deflection response; and
a second annular stand-off mechanically coupled to an outer edge of the second disc spring and to a mass to be isolated from a shock load, the second annular stand-off fixedly coupled to the first annular stand-off, the first annular stand-off and the second annular stand-off configured to hold the first disc spring and the second disc spring in a spaced apart parallel configuration, the second annular stand-off coaxial with the second disc spring.
2. The shock isolator of claim 1, wherein one of the first annular stand-off and the second annular stand-off includes a protrusion and the other of the first annular stand-off and the second annular stand-off includes a corresponding cavity configured to receive the protrusion, the protrusion and the cavity configured to coaxially align the first annular stand-off and the second annular stand-off.

3. The shock isolator of claim 1, wherein:
the first annular stand-off includes a first recess configured to receive the outer edge of the first disc spring; and
the second annular stand-off includes a second recess configured to receive the outer edge of the second disc spring.

4. The shock isolator of claim 3, wherein the first annular stand-off includes a flexible edge configured to allow insertion of the first disc spring into the first recess.

5. The shock isolator of claim 1, wherein the first disc spring and the second disc spring are configured to exhibit a combined load-deflection curve that includes a constant load region having a desired load value and a desired deflection range.

6. The shock isolator of claim 5, wherein one or more of (i) a number of discs in the shock isolator, (ii) materials of one or both of the first disc spring and the second disc spring, (iii) geometries of one or both of the first disc spring and the second disc spring, and (iv) vertical spacing between the first disc spring and the second disc spring are selected to produce one or both of the desired load value and the desired deflection range.

7. The shock isolator of claim 1, wherein a spacing between the first disc spring and the second disc spring is selected to configure the first disc spring:
to deflect by a first distance under a first shock load without deflecting the second disc spring; and
to deflect by an additional second distance under an additional second shock load, causing the second disc spring to deflect by the second distance.

8. The shock isolator of claim 7, further comprising a first elastomer gasket mechanically coupled between the outer edge of the first disc spring and the first annular stand-off, the first elastomer gasket configured to compress when the first shock load is applied to the first disc spring, prior to the first disc spring deflecting by the first distance.

9. The shock isolator of claim 7, wherein:
a sum of the first distance and the second distance is equal to 200% deflection of the first disc spring; and
the second distance is equal to 120% deflection of the second disc spring.

10. The shock isolator of claim 7, wherein the first distance is less than a distance that causes the first disc spring to deflect into an instability region of the first non-linear load-deflection response of the first disc spring.

* * * * *